United States Patent
Kubota et al.

(10) Patent No.: US 10,473,785 B2
(45) Date of Patent: Nov. 12, 2019

(54) DISTANCE MEASURING DEVICE

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventors: Hiroshi Kubota, Fussa (JP); Tomonori Fukushima, Kawasaki (JP); Nobu Matsumoto, Ebina (JP); Saki Sato, Kawasaki (JP)

(73) Assignees: KABUSHIKI KAISHA TOSHIBA, Minato-ku (JP); TOSHIBA ELECTRONIC DEVICES & STORAGE CORPORATION, Minato-ku (JP)

(*) Notice: Subject to any disclaimer, the term of this patent is extended or adjusted under 35 U.S.C. 154(b) by 0 days.

(21) Appl. No.: 15/921,143

(22) Filed: Mar. 14, 2018

(65) Prior Publication Data

US 2019/0086542 A1    Mar. 21, 2019

(30) Foreign Application Priority Data

Sep. 15, 2017   (JP) ................. 2017-178217

(51) Int. Cl.
*G01S 17/10* (2006.01)
*G01S 17/42* (2006.01)
(Continued)

(52) U.S. Cl.
CPC ........... *G01S 17/102* (2013.01); *G01S 7/487* (2013.01); *G01S 7/4863* (2013.01);
(Continued)

(58) Field of Classification Search
CPC ...... G01S 17/102; G01S 17/42; G01S 17/107; G01S 7/4856; G01S 7/4873
See application file for complete search history.

(56) References Cited

U.S. PATENT DOCUMENTS

| 5,619,317 A * | 4/1997 | Oishi | ...... G01S 17/10 |
| | | | 356/5.05 |
| 7,202,941 B2 * | 4/2007 | Munro | ...... G01S 7/483 |
| | | | 356/4.1 |

(Continued)

FOREIGN PATENT DOCUMENTS

| JP | 2011-215005 | 10/2011 |
| JP | 2014-77658 | 5/2014 |

(Continued)

*Primary Examiner* — Sang H Nguyen
(74) *Attorney, Agent, or Firm* — Oblon, McClelland, Maier & Neustadt, L.L.P.

(57) ABSTRACT

A distance measuring device according to an embodiment includes a weight value generator, a cumulative signal generator, and a distance measurer. The weight value generator generates, on the basis of similarity between a first digital signal obtained by digitizing reflected light of laser light irradiated in a first irradiation direction and a second digital signal obtained by digitizing reflected light of laser light irradiated in a second irradiation direction different from the first irradiation direction, a weight value of the second digital signal. The cumulative signal generator accumulates, on the first digital signal, a signal obtained by weighting the second digital signal with the weight value and generates a third digital signal. The distance measurer measures a distance to a target object on the basis of a time difference between irradiation timing of the laser light and timing of a peak position in the third digital signal.

18 Claims, 17 Drawing Sheets

(51) Int. Cl.
  *G01S 7/486* (2006.01)
  *G01S 7/487* (2006.01)

(52) U.S. Cl.
  CPC .......... *G01S 7/4865* (2013.01); *G01S 7/4873* (2013.01); *G01S 17/10* (2013.01); *G01S 17/107* (2013.01); *G01S 17/42* (2013.01)

(56) References Cited

U.S. PATENT DOCUMENTS

| | | |
|---|---|---|
| 7,554,652 B1 | 6/2009 | Babin et al. |
| 7,640,122 B2 | 12/2009 | Levesque et al. |
| 7,895,007 B2 | 2/2011 | Levesque et al. |
| 7,917,320 B2 | 3/2011 | Levesque et al. |
| 8,242,476 B2 | 8/2012 | Mimeault et al. |
| 8,760,632 B2 | 6/2014 | Usami |
| 8,831,908 B2 | 9/2014 | Kamitani et al. |
| 9,103,663 B2 * | 8/2015 | Min ................... G01B 11/026 |
| 9,127,910 B2 * | 9/2015 | Volfson ................ G01S 17/107 |
| 2015/0025843 A1 * | 1/2015 | Takemura ............ G01B 11/026 702/159 |
| 2015/0062302 A1 * | 3/2015 | Uchiyama ............ G01B 11/002 348/46 |
| 2015/0260845 A1 * | 9/2015 | Takemura ............. G01S 7/4815 356/3.11 |
| 2015/0271466 A1 * | 9/2015 | Yamazaki ............ G06K 9/4661 348/46 |
| 2016/0125612 A1 * | 5/2016 | Seki ...................... G06T 3/0018 382/106 |
| 2016/0259402 A1 * | 9/2016 | Masuda ................ G06F 3/0425 |
| 2017/0082746 A1 | 3/2017 | Kubota et al. |
| 2017/0148376 A1 * | 5/2017 | Yoo ...................... G09G 3/2092 |
| 2017/0199271 A1 * | 7/2017 | Nihei ................. H05B 37/0227 |
| 2017/0228927 A1 * | 8/2017 | Sugimura ................. G06T 7/70 |
| 2017/0363740 A1 | 12/2017 | Kubota et al. |

FOREIGN PATENT DOCUMENTS

| | | |
|---|---|---|
| WO | WO 2011/055418 A1 | 5/2011 |
| WO | WO 2017/143217 A1 | 8/2017 |

* cited by examiner

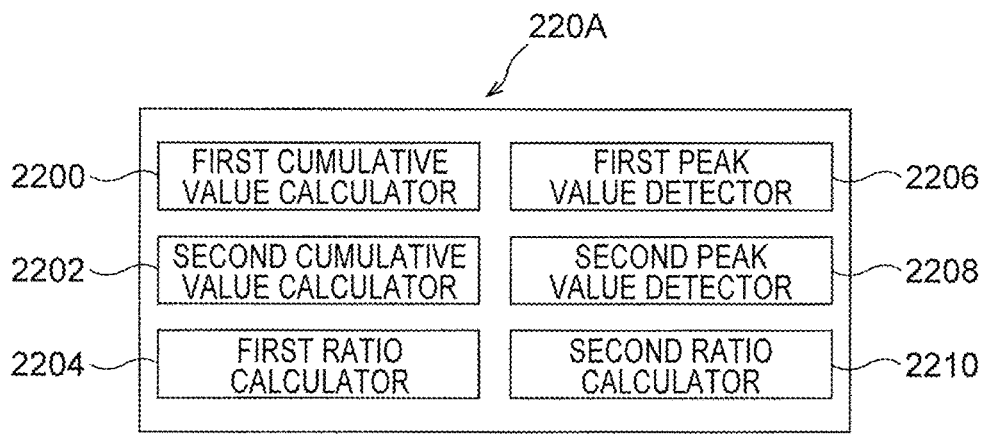
FIG. 11
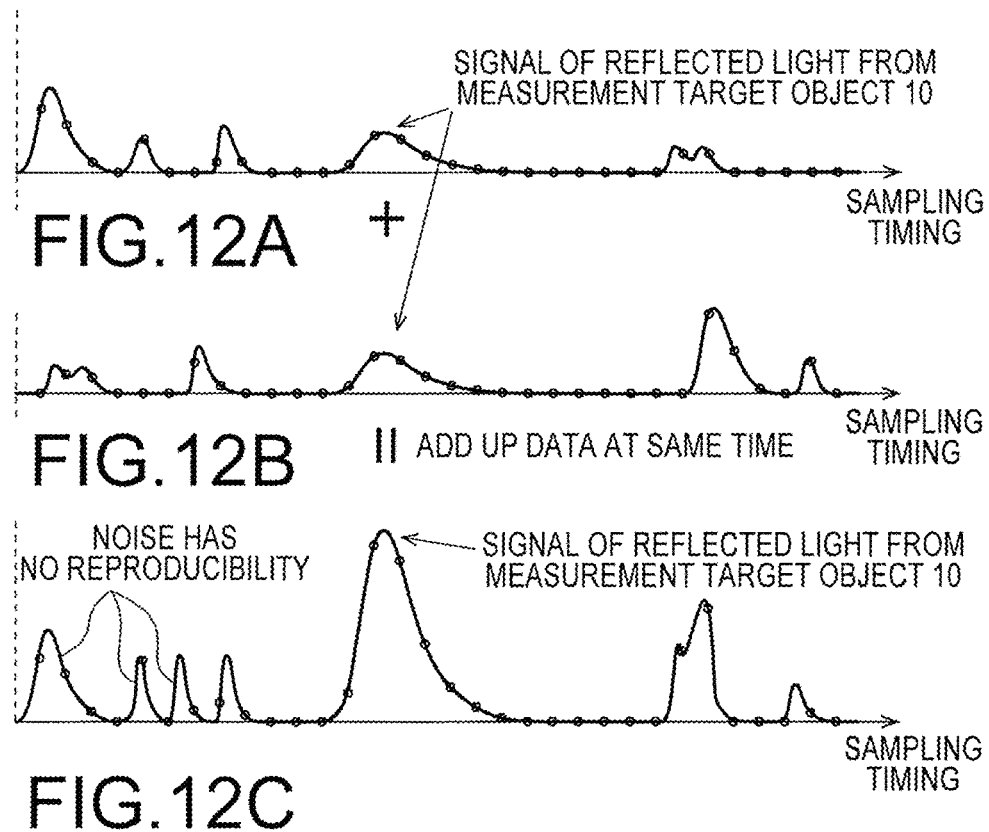
FIG. 12A
FIG. 12B
FIG. 12C

DISTANCE MEASURING DEVICE

CROSS-REFERENCE TO RELATED APPLICATIONS

This application is based upon and claims the benefit of priority from the prior Japanese Patent Application No. 2017-178217, filed on Sep. 15, 2017 the entire contents of which are incorporated herein by reference.

FIELD

Embodiments of the present invention relate to a distance measuring device.

BACKGROUND

There is known a distance measuring device called LIDAR (Light Detection and Ranging, Laser Imaging Detection and Ranging). The distance measuring device irradiates laser light on a measurement target object and converts the intensity of reflected light reflected by the measurement target object into a time-series digital signal on the basis of an output of a sensor. Consequently, the distance to the measurement target object is measured on the basis of a time difference between a point in time of emission of the laser light and a point in time corresponding to a peak of a signal value of the digital signal. Environment light such as sunlight scattered by an object is also made incident on the sensor. The environment light is noise that occurs at random. As processing in the digital signals for reducing such noise that occurs at random, a method of accumulating a plurality of digital signals at random is generally known.

When the distance measuring device is mounted on a mobile body such as a car, the number of times of irradiation of laser light on one measurement point is sometimes limited. In such a case, a plurality of digital signals based on laser lights irradiated in adjacent directions are accumulated and noise reduction processing is performed. However, if a digital signal based on reflected light from an object different from the measurement target object is accumulated, it is likely that an S/N ratio of the accumulated digital signals is reduced and measurement accuracy is deteriorated.

BRIEF DESCRIPTION OF THE DRAWINGS

FIG. 11 is a block diagram showing a detailed configuration of an accumulation processor;

FIGS. 12A to 12C are diagrams schematically showing weighted accumulation of second digital signals having high similarity;

FIGS. 13A to 13C are diagrams schematically showing weighted accumulation of second digital signals having low similarity;

DETAILED DESCRIPTION

Figure 1:
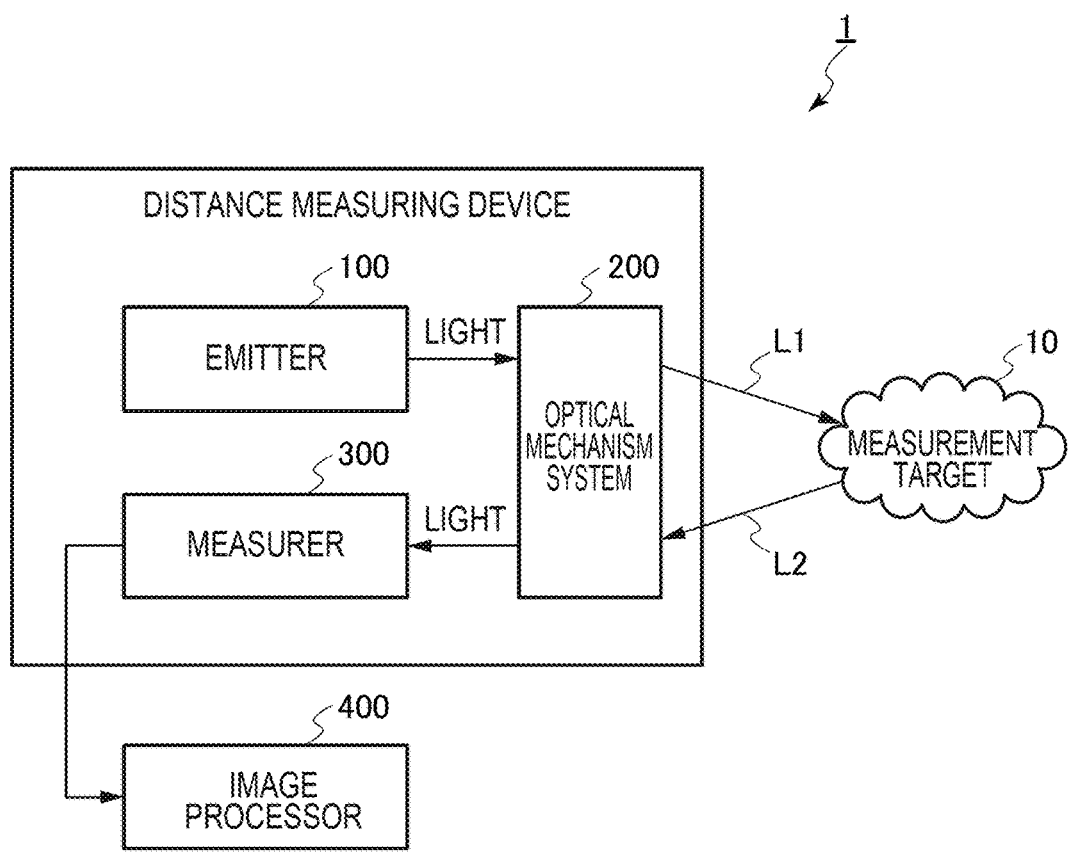
FIG. 1 is a diagram showing a schematic overall configuration of a distance measuring device according to a first embodiment.

A distance measuring device according to an embodiment includes a weight value generator, a cumulative signal generator, and a distance measurer. The weight value generator generates, on the basis of similarity between a first digital signal obtained by digitizing reflected light of laser light irradiated in a first irradiation direction and a second digital signal obtained by digitizing reflected light of laser light irradiated in a second irradiation direction different from the first irradiation direction, a weight value of the second digital signal. The cumulative signal generator accumulates, on the first digital signal, a signal obtained by weighting the second digital signal with the weight value and generates a third digital signal. The distance measurer measures a distance to a target object on the basis of a time difference between irradiation timing of the laser light and timing of a peak position in the third digital signal.

Distance measuring devices according to embodiments of the present invention are explained in detail below with reference to the drawings. Note that the embodiments explained below are examples of embodiments of the present invention. The present invention is not interpreted to be limited to the embodiments. In the drawings referred to in the embodiments, the same portions and portions having the same functions are denoted by the same or similar reference numerals and signs. Repeated explanation of the portions is sometimes omitted. Dimension ratios of the drawings are sometimes different from actual ratios for convenience of explanation. A part of components is sometimes omitted from the drawings.

First Embodiment

FIG. 1 is a diagram showing a schematic overall configuration of a distance measuring device 1 according to an embodiment. As shown in FIG. 1, the distance measuring device 1 generates a distance image of a measurement target object 10 using a scanning scheme or a TOF (Time Of Flight) scheme. More specifically, the distance measuring device 1 includes an emitter 100, an optical mechanism system 200, a measurer 300, and an image processor 400.

The emitter 100 intermittently emits laser light L1. The optical mechanism system 200 irradiates the laser light L1 emitted by the emitter 100 on the measurement target object 10 and makes reflected light L2 of the laser light L1 reflected on the measurement target object 10 incident on the measurer 300. The laser light means light having an aligned phase and an aligned frequency.

The measurer 300 measures the distance to the measurement target object 10 on the basis of the reflected light L2 received via the optical mechanism system 200. That is, the measurer 300 measures the distance to the measurement target object 10 on the basis of a time difference between a point in time when the emitter 100 irradiates the laser light L1 on the measurement target object 10 and a point in time when the reflected light L2 is measured.

The image processor 400 performs removal of noise, distortion correction, and interpolation processing and outputs final distance image data on the basis of distances to a plurality of measurement points on the measurement target object 10. The image processor 400 may be incorporated in a housing of the distance measuring device 1.

Figure 2:
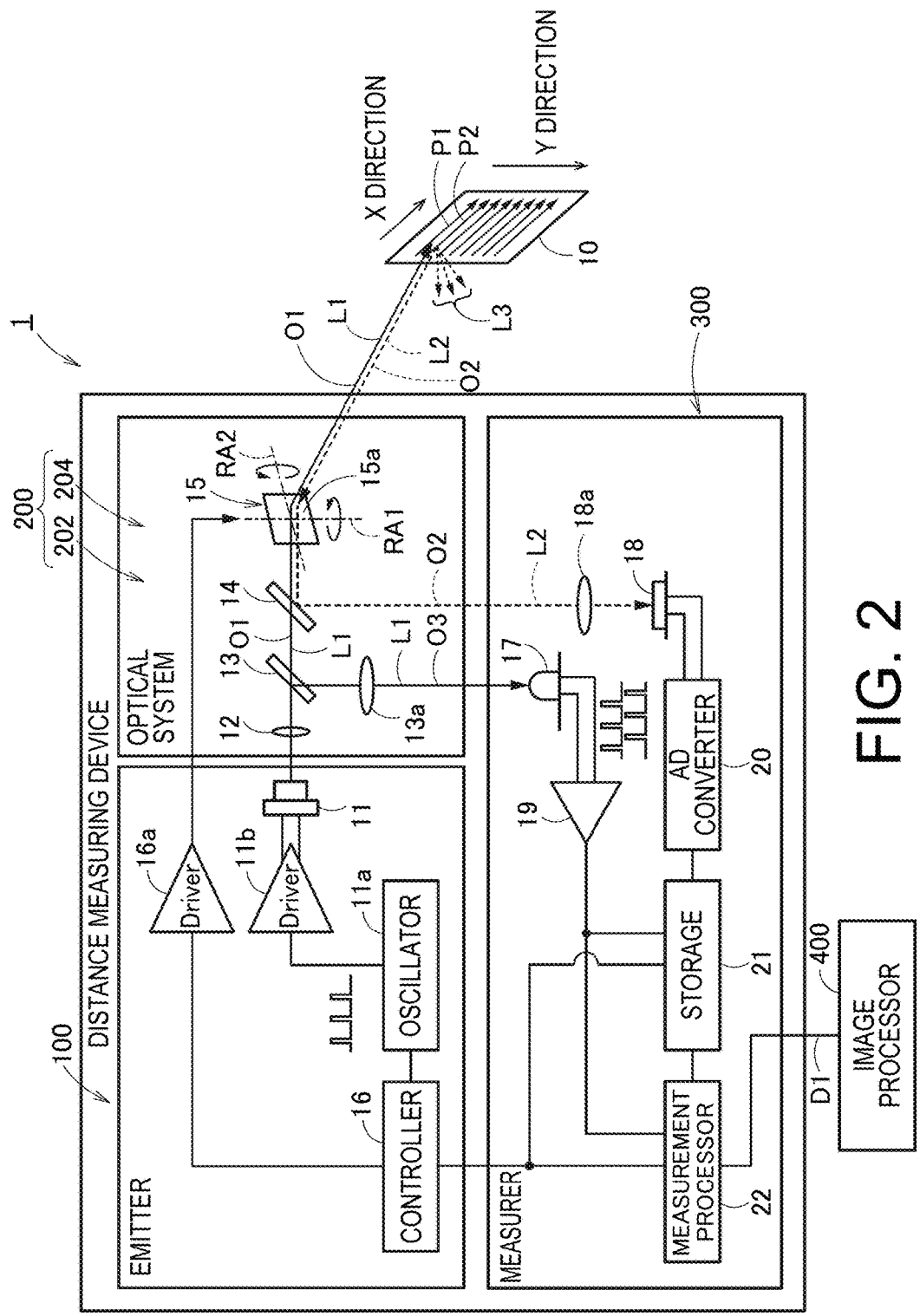
FIG. 2 is a diagram showing a configuration example of the distance measuring device according to the first embodiment.

More detailed configuration examples of the emitter 100, the mechanism optical mechanism system 200, and the measurer 300 of the distance measuring device 1 according to the first embodiment are explained with reference to FIG. 2. FIG. 2 is a diagram showing a configuration example of the distance measuring device 1 according to the first embodiment. As shown in FIG. 2, the distance measuring device 1 includes the emitter 100, the optical mechanism system 200, the measurer 300, and the image processor 400. Among scattered lights L3, scattered light in a predetermined direction is referred to as reflected light L2.

The emitter 100 includes a light source 11, an oscillator 11a, a first driving circuit 11b, a controller 16, and a second driving circuit 16a.

The optical mechanism system 200 includes an irradiation optical system 202 and a light-receiving optical system 204. The irradiation optical system 202 includes a lens 12, a first optical element 13, a lens 13a, and a mirror (a reflection device) 15.

The light-receiving optical system 204 includes a second optical element 14 and the mirror 15. That is, the irradiation optical system 202 and the light-receiving optical system 204 share the mirror 15.

The measurer 300 includes a photodetector 17, a sensor 18, a lens 18a, a first amplifier 19, an AD converter 20, a storage 21, and a measurement processor 22. Note that, as an existing method for scanning light, there is a method of rotating the distance measuring device 1 to scan light (hereinafter referred to as rotating method). As another existing method for scanning light, there is an OPA method (Optical Phased Array). This embodiment does not rely on a method of scanning light. Therefore, light may be scanned by the rotating method or the OPA method.

The oscillator 11a of the emitter 100 generates a pulse signal on the basis of control by the controller 16. The first driving circuit 11b drives the light source 11 on the basis of the pulse signal generated by the oscillator 11a. The light source 11 is a laser light source such as a laser diode. The light source 11 intermittently emits the laser light L1 according to driving by the first driving circuit 11b.

Figure 3:
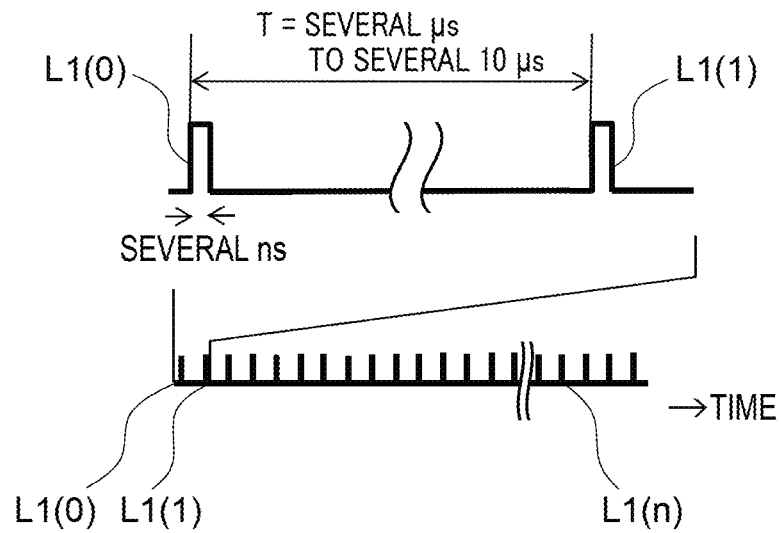
FIG. 3 is a diagram schematically showing an emission pattern of a light source.

FIG. 3 is a diagram schematically showing an emission pattern of the light source 11. In FIG. 3, the horizontal axis indicates time and the vertical axis indicates emission timing of the light source 11. A figure on the lower side is a partially enlarged view in a figure on the upper side. As shown in FIG. 3, the light source 11 intermittently repeatedly emits laser light L1(n) (0≤n<N), for example, at an interval of T=several microseconds to several ten microseconds. The laser light L1 emitted n-th is represented as L1(n). For example, "N" indicates the number of times of irradiation of the laser light L1(n) irradiated to measure the measurement target object 10.

As shown in FIG. 2, the light source 11, the lens 12, the first optical element 13, the second optical element 14, and the mirror 15 are disposed in this order on an optical axis O1 of the irradiation optical system 202. Consequently, the lens 12 collimates the intermittently emitted laser light L1 and guides the laser light L1 to the first optical element 13.

The first optical element 13 transmits the laser light L1 and makes a part of the laser light L1 incident on the photodetector 17 along an optical axis O3. The first optical element 13 is, for example, a beam splitter.

The second optical element 14 further transmits the laser light L1 transmitted through the first optical element 13 and makes the laser light L1 incident on the mirror 15. The second optical element 14 is, for example, a half mirror.

The mirror 15 includes a reflection surface 15a that reflects the laser light L1 intermittently emitted from the light source 11. The reflection surface 15a is capable of rotating around, for example, two rotation axes RA1 and RA2 crossing each other. Consequently, the mirror 15 cyclically changes an irradiation direction of the laser light L1.

The controller 16 includes, for example, a CPU (Central Processing Unit). The controller 16 performs, on the second driving circuit 16a, control for continuously changing an inclination angle of the reflection surface 15a. The second driving circuit 16a drives the mirror 15 according to a driving signal supplied from the controller 16. That is, the controller 16 controls the second driving circuit 16a to change the irradiation direction of the laser light L1.

Figure 4:
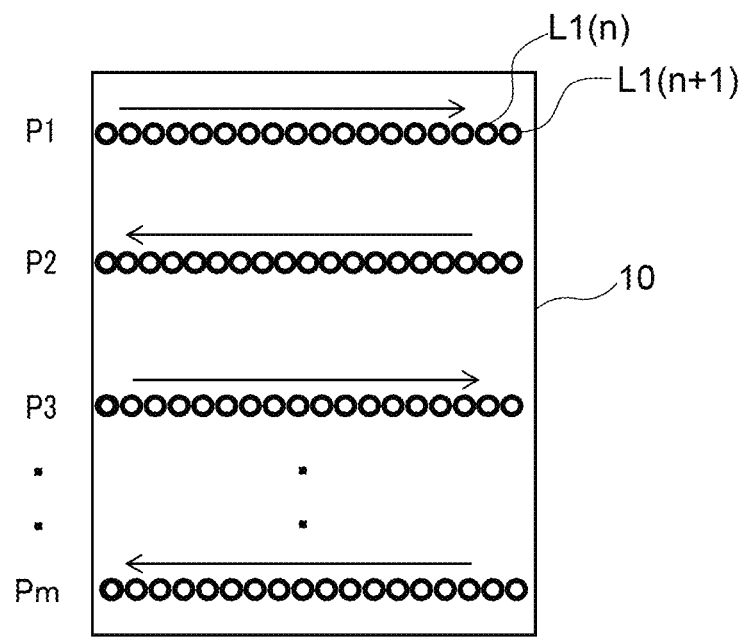
FIG. 4 is a schematic diagram enlarging and showing irradiation positions of respective laser lights on a measurement target object.

FIG. 4 is a schematic diagram enlarging and showing irradiation positions of the laser light L1 on the measurement target object 10. As shown in FIG. 4, the reflection surface 15a changes the irradiation direction for each laser light L1 and discretely irradiates the laser light L1 along a substantially parallel plurality of linear paths P1 to Pm (m is a natural number equal to or larger than 2) on the measurement target object 10. In this way, the distance measuring device 1 according to this embodiment irradiates the laser light L1(n) (0≤n<N) toward the measurement target object 10 once at a time while changing an irradiation direction O(n) (0≤n<N) of the laser light L1(n). The irradiation direction of the laser light L1(n) is represented as O(n). That is, in the distance measuring device 1 according to this embodiment, the laser light L1(n) is irradiated once in the irradiation direction O(n).

An interval of irradiation positions of laser lights L1(n) and L1(n+1) on the measurement target object 10 corresponds to the irradiation interval T=several microseconds to several ten microseconds (FIG. 3) between the laser lights L1. In this way, the laser lights L1 having different irradiation directions are discretely irradiated on the linear paths P1 to Pm. Note that the number of linear paths and a scanning direction are not particularly limited.

As shown in FIG. 2, on an optical axis O2 of the light receiving optical system 204, the reflection surface 15a of the mirror 15, the second optical element 14, the lens 18a, and the sensor 18 are disposed in the order of incidence of the reflected light L2. The optical axis O1 is a focal axis of the lens 12 that passes the center position of the lens 12. The optical axis O2 is a focal axis of the lens 18a that passes the center position of the lens 18a.

The reflection surface 15a makes the reflected light L2 traveling along the optical axis O2 among the scattered lights L3 scattered on the measurement target object 10 incident on the second optical element 14. The second optical element 14 changes a traveling direction of the reflected light L2 reflected on the reflection surface 15a and makes the reflected light L2 incident on the lens 18a of the measurer 300 along the optical axis O2. The lens 18a collimates the reflected light L2 made incident along the optical axis O2 to the sensor 18.

On the other hand, a traveling direction of light reflected in a direction different from the direction of the laser light L1 among the scattered lights L3 deviates from the optical axis O2 of the light-receiving optical system 204. Therefore, even if the light reflected in the direction different from the direction of the optical axis O2 among the scattered lights L3 is made incident in the light-receiving optical system 204, the light is absorbed by a black body in a housing in which the light-receiving optical system 204 is disposed or is made incident on a position deviating from an incident surface of the sensor 18. On the other hand, among environment lights such as sunlight scattered by some object, there are lights traveling along the optical axis O2. These lights are made incident on the incident surface of the sensor 18 at random and become random noise.

Note that, in FIG. 2, optical paths of the laser light L1 and the reflected light L2 are separately shown for clarification. However, actually, the laser light L1 and the reflected light L2 overlap. An optical path in the center of a light beam of the laser light L1 is shown as the optical axis O1. Similarly, an optical path of the center of a light beam of the reflected light L2 is shown as the optical axis O2.

The sensor 18 detects the reflected light L2 made incident from the lens 18a. The sensor 18 converts the reflected light L2 received via the light-receiving optical system 204 into an electric signal.

The sensor 18 has, for example, a photodiode. The photodiodes are composed of, for example, a semiconductor serving as a photodetector. Further, the sensor 18 may be constituted by, for example, an avalanche breakdown diode (ABD). An avalanche diode is a diode with improved light receiving sensitivity by causing avalanche breakdown at a specific reverse voltage. Furthermore, the sensor 18 may be constituted by an avalanche photodiode (AD). The avalanche photodiode (AD) is a photodiode whose light receiving sensitivity is increased by avalanche multiplication.

The AD converter 20 converts the electric signal output by the sensor 18 into a digital signal at a predetermined sampling interval. The AD converter 20 is configured by, for example, an amplifier that amplifies the electric signal based on the reflected light L2 and an AD converter (ADC: Analog to Digital Converter). The amplifier amplifies the electric signal of the sensor 18. The AD converter samples the amplified electric signal at a plurality of sampling timings and converts the electric signal into a digital signal corresponding to an irradiation direction of the laser light L1.

Figure 5:
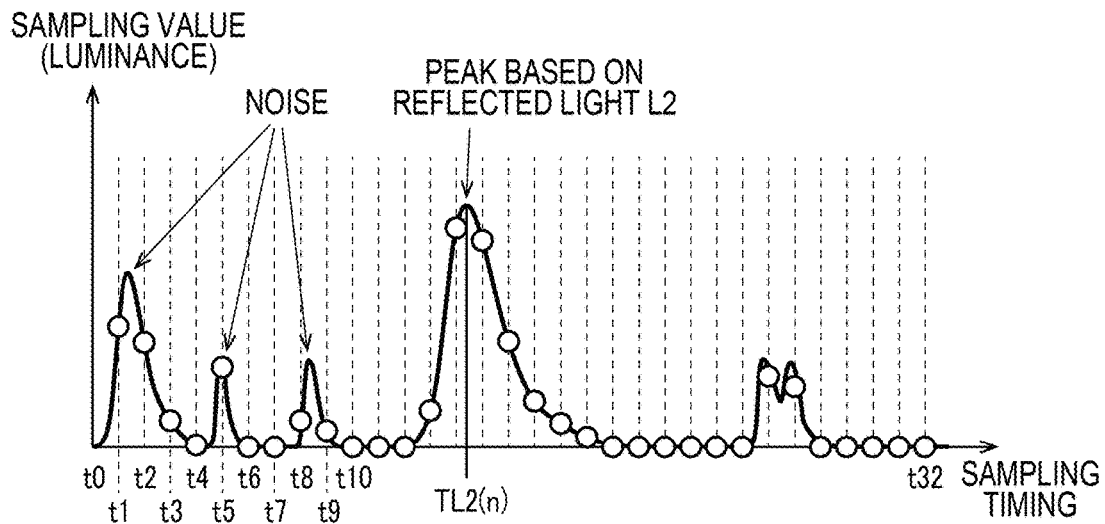
FIG. 5 is a diagram showing an example of a sampling value of an electric signal by an AD converter.

FIG. 5 is a diagram showing an example of a sampling value of the electric signal by the AD converter 20. The horizontal axis of FIG. 5 indicates sampling timing and the vertical axis indicates a sampling value (luminance), that is, a value of a digital signal. The sampling timing corresponds to a distance. For example, sampling timings t0 to t32 correspond to an elapsed time "T" (FIG. 3) from when the laser light L1 is irradiated until the next laser light L1 is irradiated. A peak in the figure is a sampling value based on the reflected light L2. Sampling timing TL2 indicating the peak corresponds to a double of the distance to the measurement target object 10.

More specifically, the distance is calculated by the following expression: distance=light speed×(sampling timing TL2−timing when the photodetector 17 detects the laser light L1)/2. The sampling timing is an elapsed time from light emission start time of the laser light L1. The timing when the photodetector 17 detects the laser light L1 is the light emission start time of the laser light L1.

Note that the number of sampling timings and a time range in which sampling is performed shown in the figure are examples. The number of sampling timings and the time range in which the sampling is performed may be changed.

As shown in FIG. 2, the storage 21 is realized by, for example, a semiconductor memory element such as a RAM (Random Access Memory) or a flash memory, a hard disk, or an optical disk. The controller 16 causes the storage 21 to store, in time series, information concerning an irradiation direction of the mirror 15 at timing when the laser light L1 is irradiated and a digital signal of the laser light L1 in association with each other. That is, the storage 21 stores, in time series, a first digital signal converted by the AD converter 20 in association with each of irradiation directions of the laser light L1.

The measurement processor 22 is, for example, an MPU (Micro Processing Unit). The measurement processor 22 measures a distance on the basis of a time difference between timing when the photodetector 17 detects the laser light L1 and timing when the sensor 18 detects the reflected light L2.

Figure 6:
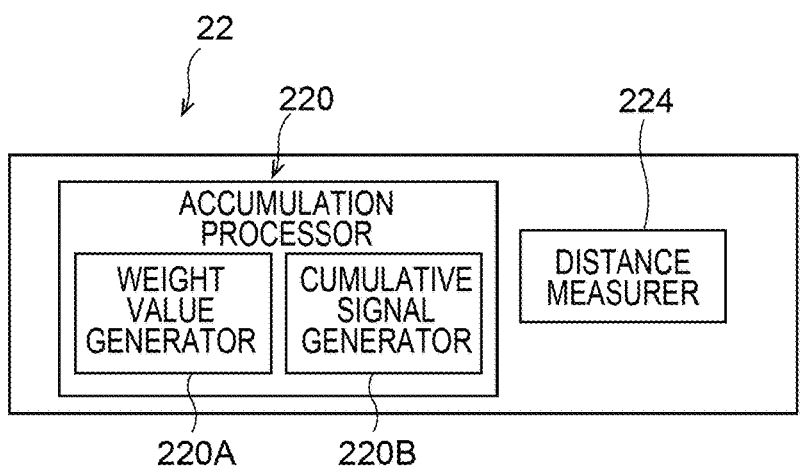
FIG. 6 is a block diagram showing a detailed configuration of a measurement processor.

FIG. 6 is a block diagram showing a detailed configuration of the measurement processor 22. The detailed configuration of the measurement processor 22 is explained with reference to FIG. 6. As shown in FIG. 6, the measurement processor 22 includes an accumulation processor 220 and a distance measurer 224.

The accumulation processor 220 performs processing for obtaining a digital signal for measurement having an S/N ratio improved from an S/N ratio of a digital signal of each laser light L1 stored in the storage 21. The accumulation processor 220 includes a weight value generator 220A and a cumulative signal generator 220B.

Each of the weight value generator 220A, the cumulative signal generator 220B, and the distance measurer 224 is realized by a hardware configuration. For example, each of the weight value generator 220A, the cumulative signal generator 220B, and the distance measurer 224 is constituted by a circuit.

The weight value generator 220A generates, on the basis of similarity stored in the storage 21 between a first digital signal obtained by digitizing the reflected light L2 of the laser light L1 irradiated in a first irradiation direction and a second digital signal obtained by digitizing the reflected light L2 of the laser light L1 irradiated in a second irradiation direction different from the first irradiation direction, a weight value of the second digital signal.

The cumulative signal generator 220B accumulates, on the first digital signal, a signal obtained by weighting the second digital signal with the weight value generated by the weight value generator 220A and generates a digital signal for measurement (a third digital signal). Detailed processing of the weight value generator 220A and the cumulative signal generator 220B is explained below.

The distance measurer 224 measures the distance to the measurement target object 10 on the basis of the time-series third digital signal having an improved S/N ratio. More specifically, the distance measurer 224 measures the distance to the measurement target object 10 on the basis of a time difference between a point in time based on irradiation of the laser light L1 and a point in time based on a peak position of a signal value of the third digital signal. The distance measurer 224 supplies a signal D1 (FIG. 2) including distance information of each laser light L1, that is, each irradiation direction to the image processor 400.

A relation between a first irradiation direction of the laser light L1(n) serving as a reference and second irradiation directions different from the first irradiation direction is explained with reference to FIG. 7.

Figures 7, 8A, 8B:
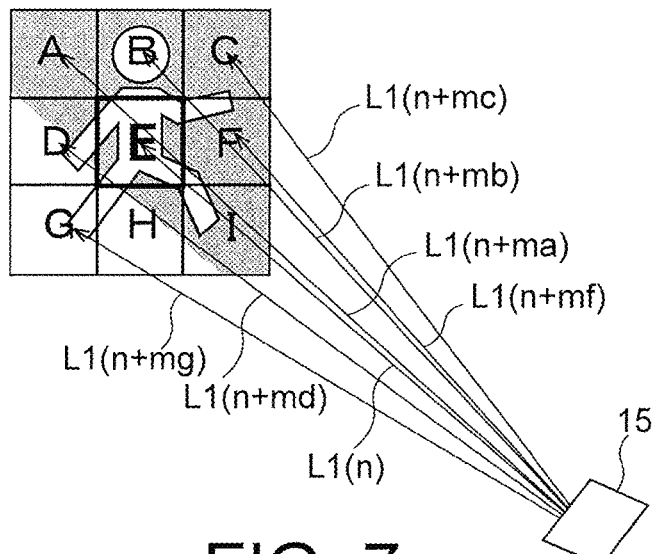
FIG. 7 is a diagram schematically showing reference laser light and laser lights irradiated in adjacent second irradiation directions.
FIGS. 8A and 8B are diagrams schematically showing digital signals obtained on the basis of reflected light shown in FIG. 7.

FIG. 7 schematically shows the reference laser light L1(n) and laser lights L1(n+ma), L1(n+mb), L1(n+mc), L1(n+md), L1(n+mf), L1(n+mg), L1(n+mh), and L1(n+mi) irradiated in second irradiation directions. An irradiation direction of the reference laser light L1(n) is referred to as first irradiation direction. Irradiation directions different from the first irradiation direction are referred to as second irradiation directions.

In FIG. 7, n+ma, n+mb, and n+mc indicating irradiation order of the laser light L1 irradiated in the second irradiation directions are continuous natural numbers within a range of 0≤n≤N. As explained above, "N" indicates the number of times of irradiation of the laser light L1(n) irradiated to measure the measurement target object 10. Similarly, n+md, n, and n+mf are also continuous natural numbers and n+mg, n+mh, and n+mi are also continuous natural numbers. As shown in FIG. 4, when the number of measurement points on one linear path among a plurality of linear paths P1 to Pm (m is a natural number equal to or larger than 2) is represented as L=N/m, there are relations: n+md=n+ma+L and n+mg=n+md+L.

An example is explained in which the same measurement target object 10 is present at traveling destinations of the laser lights L1(n+ma), L1(n+mb), L1(n+mc), L1(n+mf), and L1(n+mi) irradiated in the second irradiation directions and an object different from the measurement target object 10 is present on a nearer side than the measurement target object 10 at traveling destinations of the laser lights L(n+md), L1(n+mg), and L1(n+mh) irradiated in the second irradiation directions. That is, a measurement point on the measurement target object 10 on which the reference laser light L1(n) is irradiated is E. Measurement points on the measurement target object 10 on which the laser lights L1(n+ma), L1(n+mb), L1(n+mc), L1(n+mf), and L1(n+mi) irradiated in second irradiation directions adjacent to the laser light L1(n) are irradiated are A, B, C, F, and I. On the other hand, measurement points on the object different from the measurement target object 10 on which the laser lights L1(n+md), L1(n+mg), and L1(n+mh) are irradiated are D, G, and H. These measurement points are not present on the same plane. However, in FIG. 7, the measurement points are schematically projected on the same plane and displayed.

In this way, ma to mi are changed according to the number "L" of the measurement points on the linear path. Therefore, to simplify explanation, in this embodiment, the laser lights L1(n+ma) to L1(n+mi) irradiated in irradiation directions adjacent to the laser light L1(n) are represented by L1(n+m(Z)) (0≤Z≤(M−1)). That is, an irradiation order in the second irradiation directions centering on "n" is represented by n+m(Z). "Z" is a natural number. "M" indicates the number of second irradiation directions adjacent to the first irradiation direction. For example, in FIG. 7, since the number of adjacent irradiation directions is M=8, the adjacent second irradiation directions are represented by L1(n+m(Z)) (0≤Z≤7). Consequently, ma to mi can be represented by ma=m(0), mb=m(1), mc=m(2), md=m(3), mf=m(4), mg=m(5), mh=m(6), and mi=m(7). Note that "M" is any number.

In the following explanation, a first digital signal based on reflected light L2(n) of the laser light L1(n) in the first irradiation direction is represented by D(n). Reflected light of the laser light L1(n+m(Z)) (0≤Z≤(M−1)) in the second irradiation direction adjacent to the laser light L1(n) is represented by L2(n+m(Z)) (0≤Z≤(M−1)). An irradiation direction of the laser light L1(n+m(Z)) (0≤Z≤(M−1)) in the second irradiation direction is represented by O(n+m(Z)) (0≤Z≤(M−1)). A second digital signal based on the reflected light L2(n+m(Z)) (0≤Z≤(M−1)) is represented by D(n+m(Z)) (0≤Z≤(M−1)). A cumulative value in a predetermined period TA in the first digital signal D(n) is represented by a first cumulative value At(n)(t). A cumulative value in the predetermined period TA in the second digital signal D(n+m(Z)) (0≤Z≤(M−1)) is represented by a second cumulative value At(n+m(Z))(t) (0≤Z≤(M−1)), where "t" indicates sampling timing.

Characteristics of the first digital signal and the second digital signals are explained with reference to FIGS. 8A and 8B in view of FIG. 7. FIGS. 8A and 8B are diagrams schematically showing digital signals DA, DB, DC, DD, DE, DF, DG, DH, and DI obtained on the basis of reflected lights of the laser lights L1(n+ma), L1(n+mb), L1(n+mc), L1(n+md), L1(n), L1(n+mf), L1(n+mg), L1(n+mh), and L1(n+mi) shown in FIG. 7. That is, the first digital signal D(n) is indicated by first digital signal DE. The second digital signals D(n+m(Z)) (0≤Z≤7) are respectively indicated by second digital signals DA, DB, DC, DD, DF, DG, DH, and DI.

FIG. 8A schematically shows the digital signals DA, DB, DC, DE, DF, and DI obtained on the basis of reflected light reflected from the same measurement target object 10. FIG. 8B schematically shows the digital signals DD, DG, and DH obtained on the basis of reflected lights reflected from an object different from the measurement target object 10. The vertical axis indicates a signal value (a luminance value) and the horizontal axis indicates sampling timing.

As shown in FIG. 8A, there is a tendency that the second digital signals DA, DB, DC, DF, and DI obtained on the basis of the reflected lights L2 reflected from the measurement target object 10 are similar to the first digital signal DE. On the other hand, as shown in FIG. 8B, there is a tendency that the second digital signals DD, DG, and DH obtained on the basis of the reflected lights reflected from the object different from the measurement target object 10 have low similarity to the first digital signal DE.

Cumulative values within a time range TA of the digital signals DA, DB, DC, DD, DE, DF, DG, DH, and DI are explained with reference to FIGS. 9A to 9D in view of FIG. 7 and FIGS. 8A and 8B. FIGS. 9A to 9D are diagrams showing examples of the cumulative values within the time range TA of the digital signals DA, DB, DC, DD, DE, DF, DG, DH, and DI shown in FIGS. 8A and 8B. FIGS. 9A to 9D are, for example, measurement results in the daytime and are examples affected by environment light such as sunlight. The vertical axis indicates a signal value (a luminance value) and the horizontal axis indicates sampling timing.

Figure 9A:
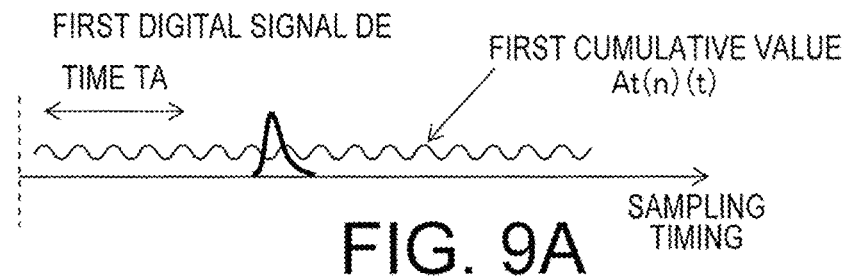
FIGS. 9A to 9D are diagrams showing examples of cumulative values within a time range of the digital signals shown in FIGS. 8A and 8B.

FIG. 9A is a diagram showing the first cumulative value At(n)(t) based on the first digital signal DE. The time range TA of an arrow indicates a time range in which accumulation is performed. The first cumulative value At(n)(t) in FIG. 9A indicates a result obtained by performing accumulation of the first digital signal DE while moving the time range TA in order from 0 to an end time of sampling.

Figure 9B:
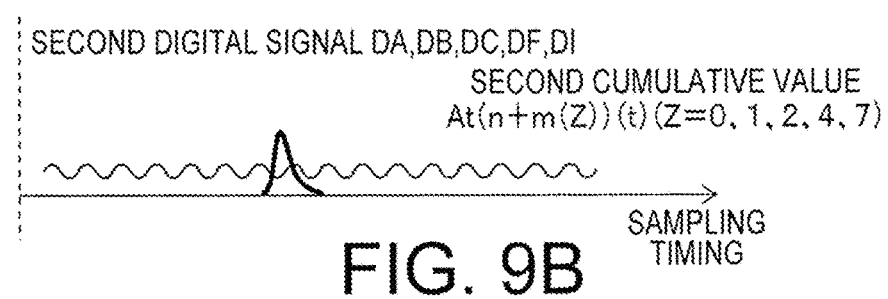
Figure 9C:
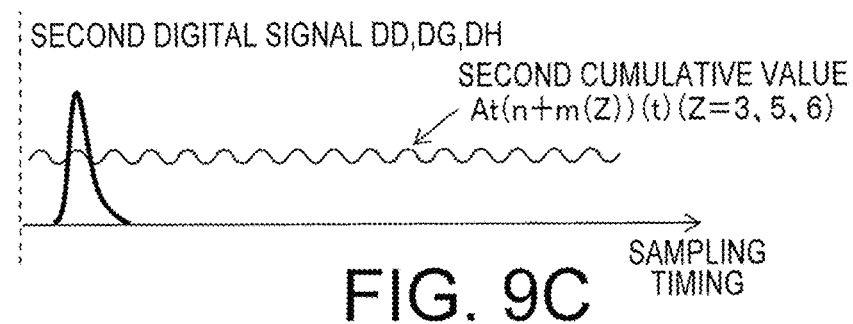

FIG. 9B shows the second cumulative value At(n+m(Z)) (t) (Z=0, 1, 2, 4, and 7) based on the second digital signals DA, DB, DC, DF, and DI. FIG. 9C shows the second cumulative value At(n+m(Z))(t) (Z=3, 5, and 6) based on the second digital signals DD, DG, and DH. Details of the first cumulative value At(n)(t) and the second cumulative value At(n+m(Z))(t) are explained below.

Figure 9D:
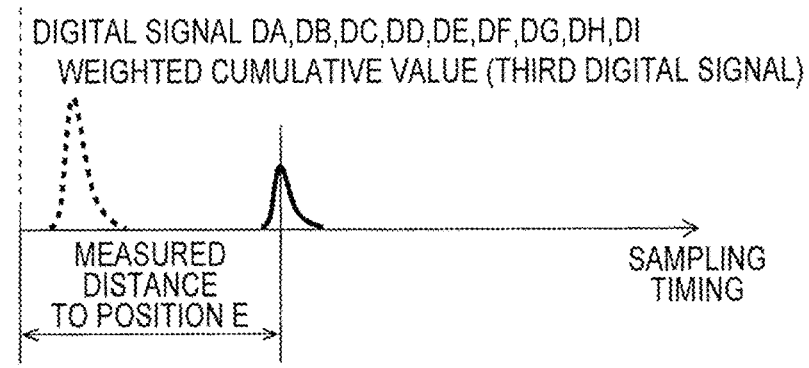

FIG. 9D shows an example of a third digital signal obtained by accumulating the second digital signals DA, DB, DC, DD, DF, DG, DH, and DI on the first digital signal DE on the basis of weight values.

As shown in FIGS. 9A and 9B, there is a tendency that the first cumulative value At(n)(t) obtained by accumulating the first digital signal DE within the time range TA shows substantially the same value as the second cumulative value At(n+m(Z))(t) (Z=0, 1, 2, 4, and 7) obtained by accumulating the respective second digital signals DA, DB, DC, DF, and DI within the time range TA. On the other hand, as shown in FIG. 9C, there is a tendency that the first cumulative value At(n)(t) shows a value different from the second cumulative value At(n+m(Z))(t) (Z=3, 5, and 6) obtained by accumulating the respective second digital signals DD, DG, and DH within the time range TA. This is considered to be because the intensities of environment lights or the like reflected by different reflection target objects are different in each of the target objects. For example, when the measurement points D, G, and H are at nearer distances from the measurement points A, B, C, E, F, and I or an object has a high reflection coefficient, cumulative values of the digital signals within the time range TA tend to increase.

Peak values of the digital signals DA, DB, DC, DD, DE, DF, DG, DH, and DI are explained with reference to FIGS. 10A to 10D in view of FIG. 7 and FIGS. 8A and 8B. FIGS. 10A to 10D are schematic diagrams showing peak values of digital signals obtained on the basis of the digital signals DA, DB, DC, DD, DE, DF, DG, DH, and DI shown in FIGS. 8A and 8B. The horizontal axis indicates sampling timing and the vertical axis indicates a signal value. FIGS. 10A to 10D are, for example, measurement results at night and are examples in which the influence of environment light such as sunlight is reduced.

Figure 10A:
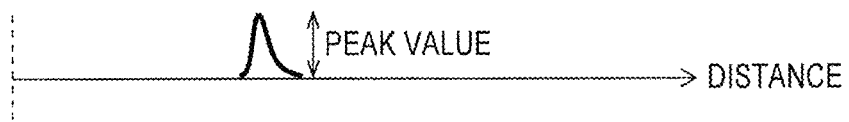
FIGS. 10A to 10D are schematic diagrams showing peak values of digital signals obtained on the basis of the digital signals shown in FIGS. 8A and 8B.
Figure 10B:
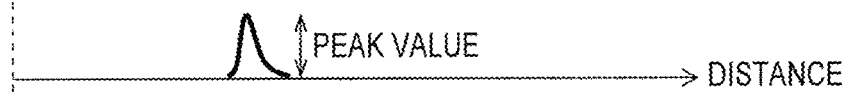
Figure 10C:
Figure 10D:
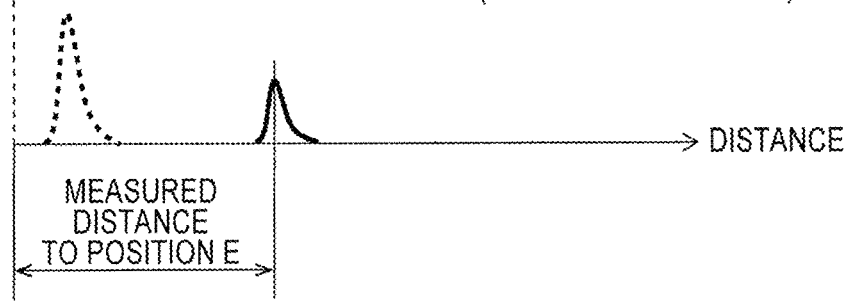

FIG. 10A shows a first peak value based on the first digital signal DE. FIG. 10B shows a second peak value based on the second digital signals DA, DB, DC, DF, and DI. FIG. 10C shows a peak value based on the second digital signals DD, DG, and DH. FIG. 10D shows the third digital signal accumulated on the basis of the weight value. A peak value based on the first digital signal D(n) is referred to as first peak value. A peak value based on the second digital signal D(n+m(Z)) (0≤Z≤(M−1)) is referred to as second peak value.

As shown in FIGS. 10A and 10B, there is a tendency that the first peak of the first digital signal DE shows the same value as the second peak value of the second digital signals DA, DB, DC, DF, and DI based on reflected light reflected from the same measurement target object 10. On the other hand, as shown in FIG. 10B, there is a tendency that the first peak value of the first digital signal DE and the second peak value of the second digital signals DD, DG, and DH based on reflected light reflected from a different measurement target object 10 show different values.

As shown in FIG. 10D, if weight values of the second digital signals DA, DB, DC, DF, and DI having high similarity are set large, weight values of the second digital signals DD, DG, and DH having low similarity are set small, and the second digital signals DA, DB, DC, DD, DF, DG, DH, and DI are accumulated on the first digital signal DE, it is possible to improve an S/N ratio of a third digital signal Ad. In particular, it is possible to further increase measurement accuracy in measurement at night.

A detailed configuration of the weight value generator 220A is explained with reference to FIG. 11 in view of FIG. 7, FIGS. 9A to 9D, and FIGS. 10A to 10D. FIG. 11 is a block diagram showing the detailed configuration of the weight value generator 220A. As shown in FIG. 11, the weight value generator 220A includes a first cumulative value calculator 2200, a second cumulative value calculator 2202, a first ratio calculator 2204, a first peak value detector 2206, a second peak value detector 2208, and a second ratio calculator 2210.

Each of the first cumulative value calculator 2200, the second cumulative value calculator 2202, the first ratio calculator 2204, the first peak value detector 2206, the second peak value detector 2208, and second ratio calculator 2210 is realized by a hardware configuration. For example, each of the first cumulative value calculator 2200, the second cumulative value calculator 2202, the first ratio calculator 2204, the first peak value detector 2206, the second peak value detector 2208, and second ratio calculator 2210 is constituted by a circuit.

As shown in FIG. 9A, the first cumulative value calculator 2200 calculates the first cumulative value At(n)(t) obtained by accumulating, within the predetermined period TA, a plurality of first digital signals D(n)(t) obtained by respectively digitizing the reflected lights L2(n) of the laser light L1(n) intermittently irradiated in the first irradiation direction. For example, the first cumulative value calculator 2200 calculates a first cumulative value At(n) according to Expression (1). D(n) is represented by a function D(n)(t) of the sampling timing t.

[Math 1]

$$At(n)(t) = K1 \times \int_{t-TA/2}^{t+TA/2} D(n)(t)dt \qquad (1)$$

where, K1 represents any constant and "n" represents a natural number in a range of 0≤n<N.

As shown in FIGS. 9B and 9C, the second cumulative value calculator 2202 calculates the second cumulative value At(n+m(Z))(t) (0≤Z≤(M−1)) obtained by accumulating, within the predetermined period TA, a plurality of second digital signals D(n+m(Z)) (0≤Z≤(M−1)) obtained by respectively digitizing reflected lights of the laser light L1(n+m(Z)) (0≤Z≤(M−1)) intermittently irradiated in the second irradiation directions. The second cumulative value calculator 2202 calculates the second cumulative value At(n+m(Z))(t) (0≤Z≤(M−1)) according to Expression (2).

The second digital signal D(n+m(Z)) is represented by a function D(n+m(Z))(t) of the sampling timing t. As explained above, "Z" represents a natural number in a range of 0≤Z≤(M−1) and "M" represents the number of second irradiation directions adjacent to the first irradiation directions.

[Math 2]

$$At(n+m(Z))(t) = K1 \times \int_{t-TA/2}^{t+TA/2} D(n+m(Z))(t)dt \quad (2)$$

The first ratio calculator 2204 calculates a first ratio R1(n, n+m(Z)) of the first cumulative value At(n)(t) accumulated by the first cumulative value calculator 2200 and the second cumulative value At(n+m(Z))(t) (0≤Z≤(M−1)) accumulated by the second cumulative value calculator 2202. The first ratio calculator 2204 substitutes any fixed time "T" in "t" of Expressions (1) and (2) and calculates the first ratio R1(n, n+m(Z)) according to Expression (3). That is, the first ratio calculator 2204 according to this embodiment uses a cumulative value of digital signals measured in the any fixed time "T" for the calculation of the first ratio R1(n, n+m(Z)). It is also possible to insert offset or minimum value processing rather than a simple ratio. In that case, the first ratio R1(n, n+m(Z)) is calculated according to Expression (3-2).

[Math 3]

$$R1(n, n+m(z)) = \frac{At(n+m(X))(T)}{At(n)(T)} \quad (3)$$

[Math 3-2]

$$R1(n, n+m(z)) = \frac{\text{Max}(At(n+m(Z))(T)+\alpha, \beta)}{\text{Max}(At(n)(T)+\alpha, \beta)} \quad (3\text{-}2)$$

For example, as shown in FIG. 10A, the first peak value detector 2206 detects a first peak value Peak(n) (0≤n<N) at which signal amplitude of the first digital signal D(n) (0≤n<N) is maximized or minimized. A first peak value of the first digital signal D(n) is represented by Peak(n).

Similarly, for example, as shown in FIGS. 10B and 10C, the second peak value detector 2208 detects a second peak value Peak(n+m(Z)) (0≤n<N) at which signal amplitude of the second digital signal D(n+m(Z)) is maximized or minimized. "Z" indicates the number of adjacent second irradiation directions. A second peak value of the second digital signal D(n+m(Z)) is represented by Peak(n+m(Z)).

The second ratio calculator 2210 calculates a second ratio R2(n, n+m(Z)) of the first peak value Peak(n) detected by the first peak value detector 2206 and the second peak value Peak(n+m(Z)) detected by the second peak value detector 2208. More specifically, the second ratio calculator 2210 calculates the second ratio R2(n, n+m(Z)) according to Expression (4). It is also possible to insert offset or minimum value processing rather than a simple ratio. In that case, the second ratio R2(n, n+m(Z)) is calculated according to Expression (4-2).

[Math 4]

$$R2(n, n+m(z)) = \frac{\text{peak}(n+m(Z))}{\text{Peak}(n)} \quad (4)$$

[Math 4-2]

$$R2(n, n+m(z)) = \frac{\text{Max}(\text{peak}(n+m(Z))+\alpha, \beta)}{\text{Max}(\text{Peak}(n)+\alpha, \beta)} \quad (4\text{-}2)$$

The weight value generator 220A shown in FIG. 6 acquires a first evaluation value Ev(n, n+m(Z)) on the basis of either one of the first ratio R1(n, n+m(Z)) and the second ratio R2(n, n+m(Z)).

For example, as indicated by Expression (5), the weight value generator 220A acquires, on the basis of the first ratio R1(n, n+m(Z)) and the first cumulative value A, the first evaluation value Ev(n, n+m(Z)) indicating similarity between the first digital signal D(n) and the second digital signal (n+m(Z)).

[Math 5]

$$Ev(n,n+m(z))=F1(R1(n,n+m(z)), At(n)(T)) \quad (5)$$

A function F1(x) is a nonlinear function that, for example, shows a maximum value when "x" is 1 and shows a smaller value as a value of "x" further deviates from 1. Consequently, the first evaluation value Ev(n, n+m(Z)) shows a highest value when a ratio of the first cumulative value and the second cumulative value is 1 and shows a smaller value as the ratio further deviates from 1. As indicated by Expression (5), the first evaluation value Ev(n, n+m(Z)) calculated using the cumulative values is suitable for measurement processing in the daytime easily affected by environment light such as sunlight because the first evaluation value Ev(n, n+m(Z)) is less easily affected by random noise.

For example, as indicated by Expression (6), the weight value generator 220A may acquire the first evaluation value Ev(n, n+m(Z)) on the basis of the second ratio R2(n, n+m(Z)) and the first peak value Peak(n).

[Math 6]

$$Ev(n,n+m(z))=F1(R2(n,n+m(z)),Peak(n)) \quad (6)$$

That is, the first evaluation value Ev(n, n+m(Z)) shows a highest value when a ratio of the first peak value Peak(n) and the second peak value Peak(n+m(Z)) is 1 and shows a smaller value as the ratio further deviates from 1. As indicated by Expression (6), the first evaluation value Ev(n, n+m(Z)) calculated using the peak values is suitable for measurement processing at night without environment light when measurement accuracy of the peak values is higher.

Note that the first evaluation value Ev(n, n+m(Z)) is not limited to the second ratio R2(n, n+m(Z)) of the first peak value Peak(n) and the second peak value Peak(n+m(Z)) as long as the first evaluation value Ev(n, n+m(Z)) is a value indicating similarity between the first peak value Peak(n) and the second peak value Peak(n+m(Z)). For example, a ratio of the absolute value of a difference value between the first peak value Peak(n) and the second peak value Peak(n+m(Z)) and the first peak value Peak(n) may be set as the first evaluation value Ev(m, n+m(Z)). In this case, the first evaluation value Ev(n, n+m(Z)) shows a highest value when the ratio of the absolute value of the difference value between the first peak value Peak(n) and the second peak value Peak(n+m(Z)) and the first peak value Peak(n) is 0 and shows a smaller value as the ratio increases to a value larger than 0.

The weight value generator 220A may acquire the first evaluation value Ev(n, n+m(Z)) on the basis of the first ratio R1(n, n+m(Z)) and the second ratio R2(n, n+m(Z)). In this case, the first evaluation value Ev(n, n+m(Z)) shows a highest value as both of the first ratio R1(n, n+m(Z)) and the second ratio R2(n, n+m(Z)) are close to 1 and shows a lower value as either one of the ratios increases to a value larger than 1 or decreases to a value smaller than 1. In this way, the first evaluation value Ev(n, n+m(Z)) calculated using the cumulative values and the peak values is suitable for measurement processing in all time periods in the daytime and at night.

For example, as indicated by Expressions (7) to (9), the weight value generator 220A generates a weight value W(n, n+m(Z)) between the first digital signal D(n) and the second digital signal D(n+m(Z)) on the basis of the first evaluation value Ev(n, n+m(Z)). That is, Expression (7) indicates the weight value W(n, n+m(Z)) generated using the first ratio R1(n, n+m(Z)). Expression (8) indicates the weight value W(n, n+m(Z)) generated using the second ratio R2(n, n+m(Z)). Expression (9) indicates the weight value W(n, n+m(Z)) generated using the first ratio R1(n, n+m(Z)) and the second ratio R2(n, n+m(Z).

[Math 7]

$$W(n,n+m(z))=F2(Ev(n,n+m(z)))=F2(F1(R1(n,n+m(z)))) \quad (7)$$

[Math 8]

$$W(n,n+m(z))=F2(Ev(n,n+m(z)))=F2(F1(R2(n,n+m(z)))) \quad (8)$$

[Math 9]

$$W(n,n+m(z))=F2(Ev(n,n+m(z)))=F2(F3(R1(n,n+m(z)),R2(n,n+m(z)))) \quad (9)$$

Note that, when the first ratio R1(n, n+m(Z)) is calculated by Expression (3) or Expression (3-2), a standard deviation, dispersion, an amplitude value, an integration value of the absolute value of a difference from an average, and the like, which are signals representing an S/N ratio of a digital signal may be used instead of the cumulative value. That is, the weight value generator 220A may calculate, as a first calculation value, any one of a standard deviation, dispersion, an amplitude value, an integration value of the absolute value of a difference from an average, and the like, which are signals representing an S/N ratio in a first digital signal predetermined period, calculate, as a second calculation value, any one of a standard deviation, dispersion, an amplitude value, an integration of the absolute value of a difference from an average, and the like, which are signals representing an S/N ratio in a second digital signal predetermined period, and generate a weight value of a second digital signal on the basis of a ratio of the first calculation value and the second calculation value.

A function F2(x) is, for example, a monotone increasing function. For example, a maximum value of the Function F2(x) is 1.0 and a minimum value of the Function F2(x) is 0. F3(x1, x2) is a binary function of the first ratio R1(n, n+m(Z)) and the second ratio R2(n, n+m(Z)) and is a function, a value of which is larger as both of the first ratio R1(n, n+m(Z)) and the second ratio R2(n, n+m(Z)) are closer to 1 and the value of which is smaller as any one ratio of the first ratio R1(n, n+m(Z)) and the second ratio R2(n, n+m(Z)) increases to a value larger than 1 or decreases to a value smaller than 1. In this way, the weight value generator 220A generates, as a larger value, the weight value W(n, n+m(Z)) of the second digital signal D(n+m(Z)) having high similarity to the first digital signal D(n).

When the first ratio R1(n, n+m(Z)) or the second ratio R2(n, n+m(Z)) used for the acquisition of the first evaluation value Ev(n, n+m(Z)) exceeds a predetermined range, the weight value generator 220A sets a weight value to 0. That is, a second digital signal having a weight value 0 is not accumulated. Consequently, it is possible to prevent the influence of a digital signal having a large difference in characteristics. Note that the first evaluation value Ev(n, n+m(Z)) according to this embodiment is acquired on the basis of a ratio of cumulative values, a ratio of peak values, and the like in a predetermined time range. However, the first evaluation value Ev(n, n+m(Z)) is not limited to the ratio of cumulative values, the ratio of peak values, and the like and only has to be a numerical value indicating similarity between digital signals. Note that the first evaluation value Ev(n, n+m(Z)) or the like indicating similarity between the first and second digital signals may be processed by another calculator or CPU.

As indicated by the following Expression (6), the cumulative signal generator 220B accumulates, on the first digital signal D(n), a signal obtained by weighting the second digital signal D(n+m(Z)) with the weight value W(n, n+m(Z)) and generates a third digital signal Ad(n). As explained above, "M" indicates the number of second irradiation directions adjacent to a first irradiation direction.

[Math 10]

$$Ad(n) = D(n) + \sum_{Z=0}^{Z=M-1} W(n, n+m(z)) \times D(n+m(Z)) \quad (10)$$

First, a third digital signal obtained by accumulating second digital signals having high similarity to a first digital signal is explained with reference to FIGS. 12A to 12C. FIGS. 12A to 12C are diagrams schematically showing the first digital signal DE and the second digital signal DA (FIG. 8A) are subjected to weighted accumulation.

FIG. 12A schematically shows the first digital signal DE obtained on the basis of the reflected light L2 from the measurement target object 10. FIG. 12B schematically shows the second digital signal DA obtained on the basis of the reflected light L2 from the measurement target object 10. FIG. 12C schematically shows a third digital signal obtained by subjecting the first digital signal DE and the second digital signal DA to weighted accumulation. Since the first digital signal DE and the second digital signal DA have high similarity, a value close to the maximum value 1.0 is given as a weight value.

As shown in FIG. 12C, the reflected light L2 from the measurement target object 10 is sampled at substantially the same sampling timing. Therefore, the intensity of a signal is increased by accumulating the reflected light L2. On the other hand, random noise such as sunlight and irregularly reflected light has no reproducibility. Therefore, the random noise is relatively reduced by accumulation compared with the reflected light L2 from the measurement target object 10.

Figure 13C:
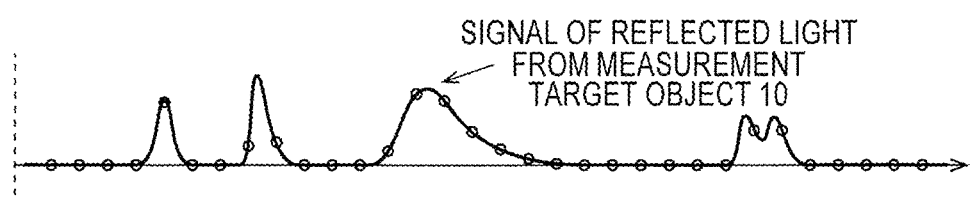
Figure 13C:
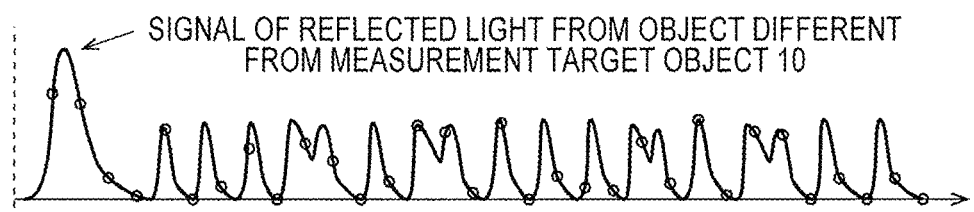
Figure 13C:
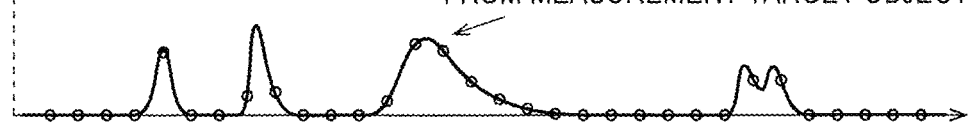

A third digital signal obtained by accumulating a second digital signal having low similarity is accumulated on a first digital signal is explained with reference to FIGS. 13A to 13C. FIGS. 13A to 13C are diagrams schematically showing weighted accumulation of the second digital signal DD (FIG. 8B) on the first digital signal DE. FIG. 13A schematically shows the first digital signal DE obtained on the basis of reflected light from the measurement target object 10. FIG. 13B schematically shows the second digital signal DD obtained on the basis of reflected light reflected from an object different from the measurement target object 10. Since similarity between the first digital signal DE and the second digital signal DD is low, for example, a value close to the minimum value 0 is given as a weight value.

FIG. 13C schematically shows a result obtained by multiplying the second digital signal DD by the weight value set close to 0 and accumulating the second digital signal DD on the first digital signal DE. As shown in FIG. 11C, the weight value generator 220A further reduces the weight value of the second digital signal DD having low similarity to the first digital signal DE. Therefore, it is possible to prevent a decrease in an S/N ratio of the third digital signal.

The configuration according to this embodiment is as explained above. An operation example of the distance measuring device 1 according to this embodiment is explained in detail below.

Figure 14:
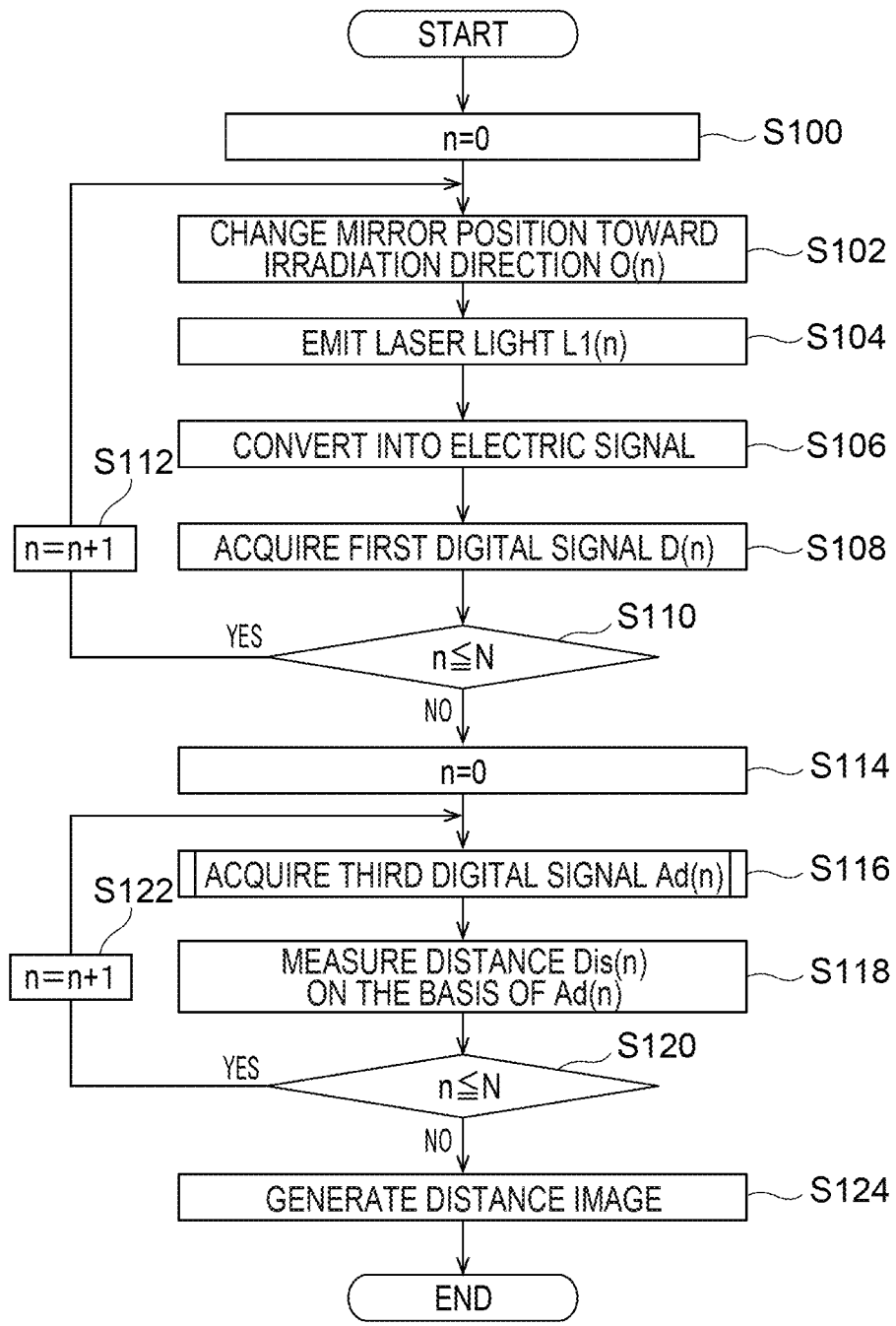
FIG. 14 is a flowchart for explaining a processing operation of the distance measuring device according to the first embodiment.

FIG. 14 is a flowchart for explaining a processing operation of the distance measuring device 1 according to the first embodiment. An overall processing operation in the distance measuring device 1 is explained with reference to FIG. 14.

First, the controller 16 in the emitter 100 sets 0 in "n" and controls the second driving circuit 16a to change the position of the mirror 15 toward an irradiation direction O(n) (step 100 and 102).

The controller 16 controls the oscillator 11a and the first driving circuit 11b to emit the laser light L1(n) (step 104).

Subsequently, the reflected light L2(n) traveling along the optical axis O2 of the light-receiving optical system is received by the sensor 18 via the mirror 15, the second optical element 14, and the lens 18a and converted into an electric signal (step 106).

Subsequently, the AD converter 20 performs sampling of the electric signal corresponding to the reflected light L2(n). The controller 16 causes the storage 21 to store, in time series, a digital signal D(n) associated with the irradiation direction O(n) (step 108).

Subsequently, the controller 16 determines whether "n" is equal to or smaller than "N" (step 110). When "n" is equal to or smaller than "N" (YES in step 110), the controller 16 adds 1 to "n" (step 108) and repeats the processing from step 102.

On the other hand, when "n" is larger than "N" (NO in step 110), the measurement processor 22 sets 0 in "n" and acquires the third digital signal Ad(n) of the digital signal D(n) stored in the storage 21 (steps 114 and 116).

Subsequently, the measurement processor 22 measures a distance Dis(n) to the measurement target object 10 in the irradiation direction O(n) based on the third digital signal Ad(n) and supplies the distance Dis(n) to the image processor 400 (step 118).

Subsequently, the measurement processor 22 determines whether "n" is equal to or smaller than "N" (step 102). When "n" is equal to or smaller than "N" (YES in step 120), the measurement processor 22 adds 1 to "n" (step 122) and repeats the processing from step 116.

On the other hand, when "n" is larger than "N" (NO in step 120), the image processor 400 generates a two-dimensional distance image on the basis of the distance Dis(n) (0≤n≤N) (step 124) and ends the overall processing operation in the distance measuring device 1.

In this way, first, the distance measuring device 1 performs sampling of the digital signal D(n) (0≤n≤N) of the laser light L1(n) (0≤n≤N). Thereafter, the distance measuring device 1 measures, while acquiring the third digital signal Ad(n) (0≤n≤N), which is a weighted cumulative value of the digital signal D(n) (0≤n≤N), the distance Dis(n) (0≤n≤N) based on Ad(n) (0≤n≤N). The image processing device 400 generates a two-dimensional distance image based in the distance Dis(n) (0≤n≤N).

Figure 15:
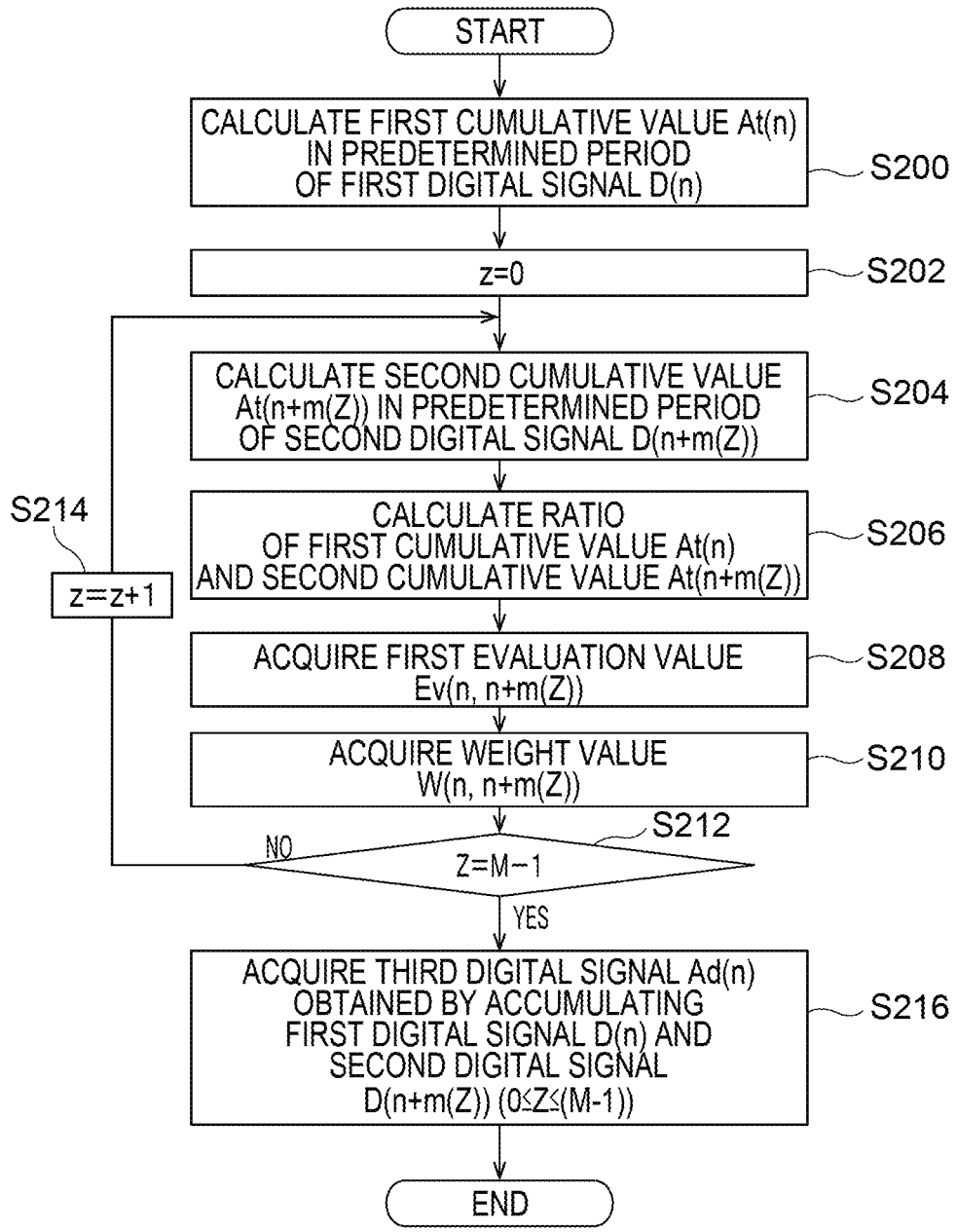
FIG. 15 is a flowchart for explaining processing content of step 116 in FIG. 14.

Processing content of step 116 in FIG. 14 is explained in detail with reference to FIG. 15. FIG. 15 is a flowchart for explaining the processing content in step 116 in FIG. 14. An acquisition example of the third digital signal Ad(n) more suitable for measurement in the daytime is explained. "Z" is a natural number and "M" indicates the number of second irradiation directions adjacent to the first irradiation direction.

First, the first cumulative value calculator 2200 of the weight value generator 220A calculates the first cumulative value At(n) in the predetermined period TA in the first digital signal D(n) and sets 0 in "Z" (steps 200 and 202).

Subsequently, the second cumulative value calculator 2202 calculates a second cumulative value At(n+m(Z)) in a predetermined period of the digital signal D(n+m(Z)) corresponding to a second irradiation direction O(n+m(Z)) (step 204).

Subsequently, the first ratio calculator 2204 calculates the ratio R1(n, n+m(Z)) of the first cumulative value At(n) and the second cumulative value At(n+m(Z) (step 206).

Subsequently, the weight value generator 220A acquires, on the basis of the ratio, the first evaluation value Ev(n, n+m(Z)) indicating similarity between the first digital signal D(n) and the second digital signal D(n+m(Z)) (step 208).

The weight value generator 220A acquires, on the basis of the first evaluation value Ev(n, n+m(Z)), the weight value W(n, n+m(Z)) of the first digital signal D(n) and the second digital signal D(n+m(Z)) and causes the storage 21 to store the weight value W(n, n+m(Z)) (step 210).

Subsequently, the weight value generator 220A determines whether "Z" is equal to M−1 (step 212). When "Z" is not equal to M−1 (NO in step 212), the weight value generator 220A adds 1 to "Z" and repeats the processing from step 204.

On the other hand, when "Z" is equal to M−1 (YES in step 212), the cumulative signal generator 220B calculates, on the basis of the weight value W(n, n+m(Z)) (0≤Z≤(M=1)) read from the storage 21, the third digital signal Ad(n) obtained by accumulating, on the first digital signal D(n), the respective second digital signals D(n+m(Z)) (1≤m≤M) weighted by the weight value W(n, n+m(Z)) (0≤m≤(M−1)) (step 216) and ends the processing in step 116.

In this way, the weight value generator 220A acquires the weight value W(n, n+m(Z)) based on the first evaluation value Ev(n, n+m(Z)) while calculating the ratio of the first cumulative value At(n) and the second cumulative value At(n+m(Z)). After acquiring the weight value W(n, n+m(Z)) (1≤m≤M), the cumulative signal generator 220B calculates the third digital signal Ad(n).

Figure 16:
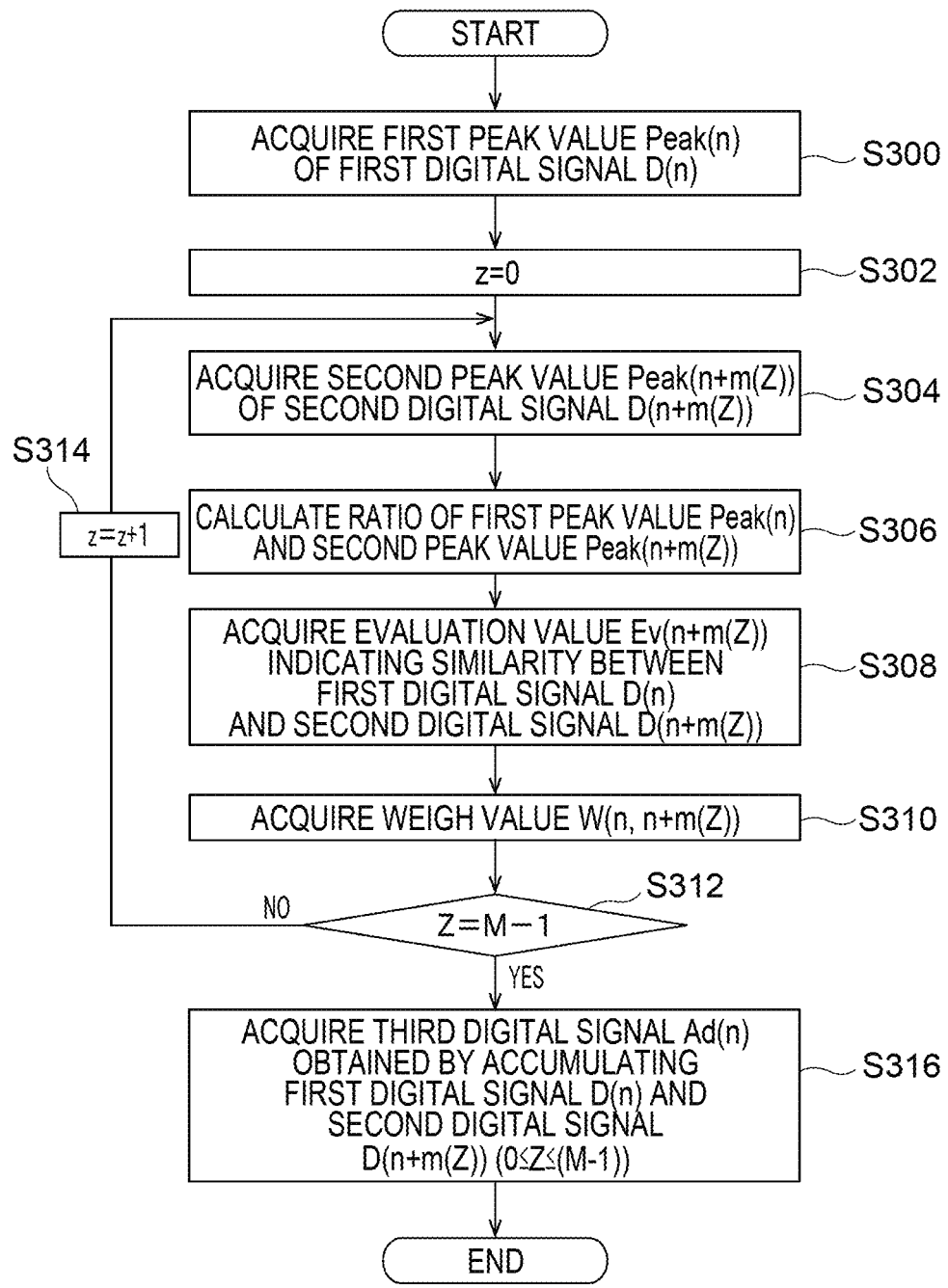
FIG. 16 is a flowchart for explaining processing performed using peak values in the processing of step 116 in FIG. 14.

Content of step 116 in FIG. 14 is explained in detail with reference to FIG. 16. FIG. 16 is a flowchart for explaining processing performed using a peak value in the processing of step 116. An acquisition example of the third digital signal Ad(n) more suitable for measurement at night is explained.

First, the first peak value detector 2206 of the weight value generator 220A detects the first peak value Peak(n) of the first digital signal D(n) and sets 0 in "Z" (steps 300 and 302).

The second peak value detector 2208 detects the second peak value Peak(n+m(Z)) in the second digital signal D(n+m(Z)) (step 304).

Subsequently, the second ratio calculator 2210 calculates the second ratio R2(n, n+m(Z)) of the first peak value Peak(n) and the second peak value Peak(n+m(Z)) (step 306).

Subsequently, the weight value generator 220A acquires, on the basis of the second ratio R2(n, n+m(Z)), the first evaluation value Ev(n, n+m(Z)) indicating similarity between the first digital signal D(n) and the second digital signal D(n+m(Z)) (step 308).

The weight value generator 220A acquires, on the basis of the first evaluation value Ev(n, n+m(Z)), the weight value W(n, n+m(Z)) of the first digital signal D(n) and the second digital signal D(n+m(Z)) and causes the storage 21 to store the weight value W(n, n+m(Z)) (step 310).

Subsequently, the weight value generator 220A determines whether "Z" is equal to M−1 (step 312). When "Z" is not equal to M−1 (NO in step 312), the weight value generator 220A adds 1 to "Z" and repeats the processing from step 302.

On the other hand, when "Z" is equal to M−1 (YES in step 312), the cumulative signal generator 220B calculates, on the basis of the weight value W(n, n+m(Z)) (0≤Z≤(M−1)) read from the storage 21, the third digital signal Ad(n) obtained by accumulating, on the first digital signal D(n), the respective second digital signals D(n+m(Z)) (1≤m≤M) weighted by the weight value W(n, n+m(Z)) (0≤m≤(M−1)) (step 316) and ends the processing in step 116.

In this way, the weight value generator 220A acquires the weight value W(n, n+m(Z)) based on the first evaluation value Ev(n, n+m(Z)) while calculating the ratio of the first peak value Peak(n) and the second peak value Peak(n+m (Z)). After acquiring the weight value W(n, n+m(Z)) (1≤m≤M), the cumulative signal generator 220B calculates the third digital signal Ad(n).

Figure 17:
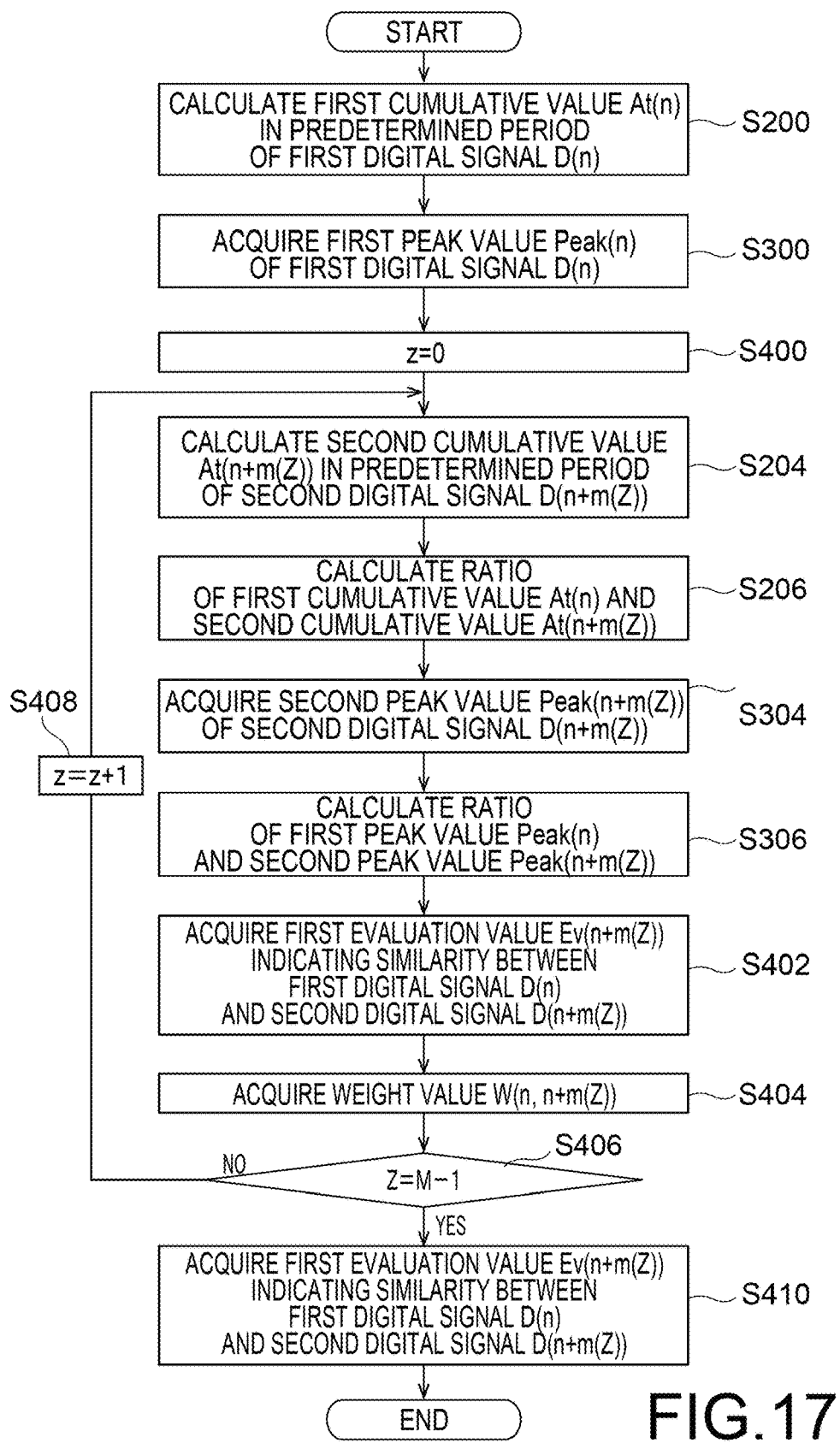
FIG. 17 is a flowchart for explaining processing performed using cumulative values and peak values in the processing in step 116 in FIG. 14.

The content of step 116 in FIG. 14 is explained in detail with reference to FIG. 17. FIG. 17 is a flowchart for explaining processing performed using cumulative values and peak values in the processing in step 116 in FIG. 14. An acquisition example of the third digital signal Ad(n) suitable for measurement in the daytime and at night is explained. Processing equivalent to the processing shown in FIGS. 15 and 16 is denoted by the same numbers and explanation of the processing is omitted.

The weight value generator 220A acquires, on the basis of a first ratio of the first cumulative value At(n) and the second cumulative value At(n+m(Z)) and a second ratio of a first peak value L1k(n) and a second peak value L1k(n+m), the first evaluation value Ev(n, n+m(Z)) indicating similarity between the first digital signal D(n) and the second digital signal D(n+m) (step 402).

The weight value generator 220A acquires, on the basis of the evaluation value Ev(n, n+m(Z)), the weight value W(n, n+m(Z)) of the first digital signal D(n) and the second digital signal D(n+m(Z)) and causes the storage 21 to store the weight value W(n, n+m(Z)) (step 404).

Subsequently, the weight value generator 220A determines whether "Z" is equal to M−1 (step 406). When "Z" is not equal to M−1 (NO in step 406), the weight value generator 220A repeats the processing from step 400.

On the other hand, when all weight values are acquired (YES in step 406), the cumulative signal generator 220B calculates, on the basis of the weight value W(n, n+m(Z)) (0≤Z≤(M−1)) read from the storage 21, the third digital signal Ad(n) obtained by accumulating, on the first digital signal D(n), the respective second digital signals D(n+m(Z)) (1≤m≤M) weighted by the weight value W(n, n+m(Z)) (0≤m≤(M−1)) (step 410).

In this way, the weight value generator 220A acquires the weight value W(n, n+m(Z)) based on the first evaluation value Ev(n, n+m(Z)) while calculating the first ratio R1(n, n+m(Z)) of the first cumulative value At(n) and the second cumulative value At(n+m(Z)) and the second ratio R2(n, n+m(Z)) of the first peak value Peak(n) and the second peak value Peak(n+m(Z)). After acquiring the weight value W(n, n+m(Z)) (1≤m≤M), the cumulative signal generator 220B calculates the third digital signal Ad(n).

As explained above, with the distance measuring device 1 according to this embodiment, the weight value generator 220A generates, on the basis of similarity between a first digital signal obtained by digitizing reflected light of laser light irradiated in a first irradiation direction and a second digital signal obtained by digitizing reflected light of laser light irradiated in a second irradiation direction different from the first irradiation direction, a weight value of the second digital signal. Consequently, the weight value generator 220A can increase the weight of the second digital signal when the similarity is high. By accumulating the weighted second digital signal on the first digital signal to generate a third digital signal, it is possible to accurately and stably measure the distance to a target object on the basis of a time difference between timing of a peak position in the third digital signal and irradiation timing of the laser light without being affected by noise.

Second Embodiment

In a second embodiment, processing for irradiating a range wider than the range in the first embodiment with laser light and receiving reflected light from this range with the sensor 18 is repeated a plurality of times to correct a light reception amount of a specific pixel in the sensor 18 to reduce the influence of noise.

More specifically, in the second embodiment, on the basis of similarity between a first digital signal corresponding to laser light irradiated in a first direction from a light source most recently using a light source that simultaneously intermittently emits laser lights in a first irradiation direction and a second irradiation direction a plurality of times and a plurality of second digital signals for the plurality of times, weight values of the plurality of second digital signals are generated. Signals obtained by weighting the plurality of second digital signals with the weight values are accumulated on the first digital signal corresponding to the laser light irradiated in the first direction from the light source most recently to generate a third digital signal.

Figure 18:
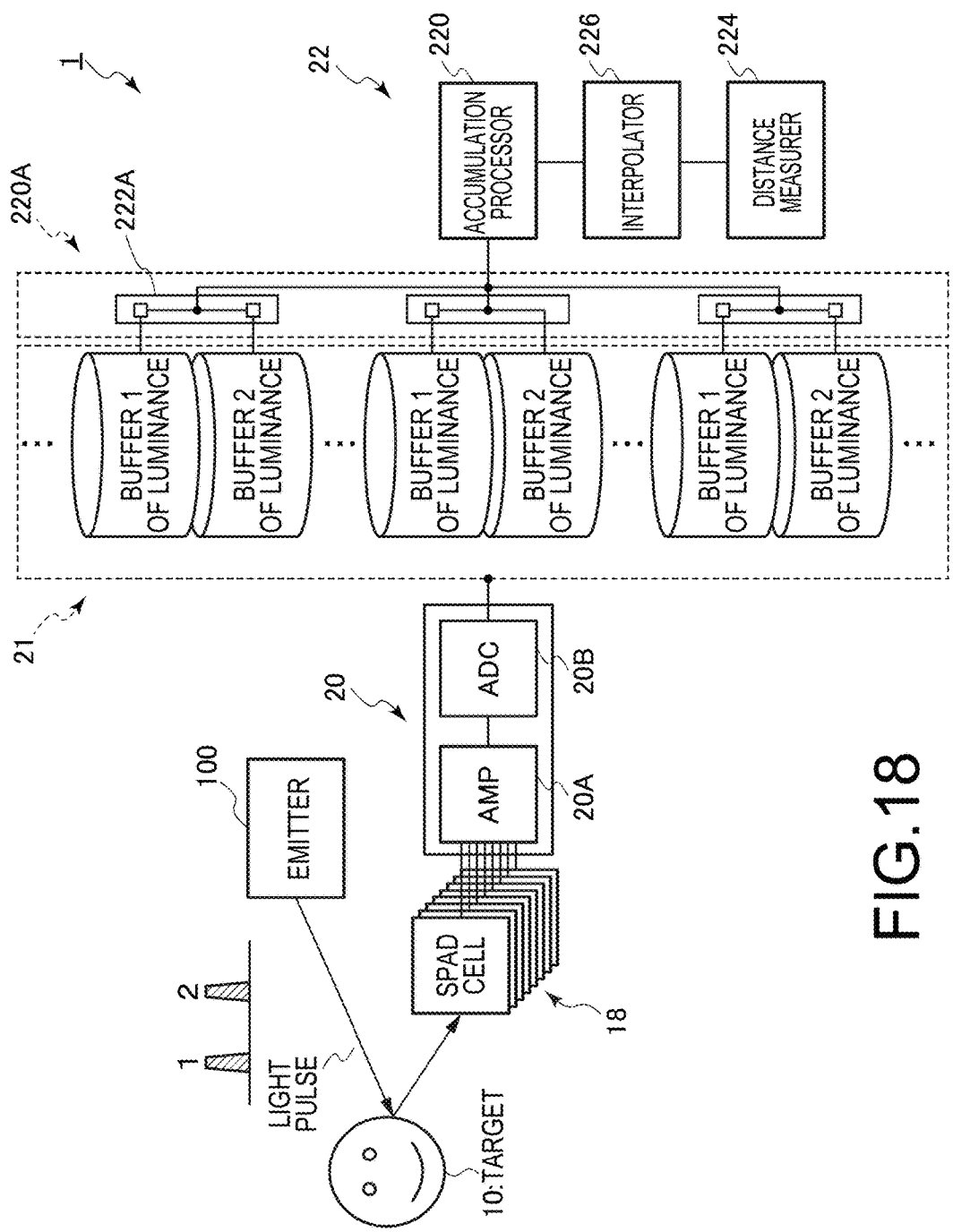
FIG. 18 is a diagram showing a schematic configuration of a distance measuring device 1 according to a second embodiment.

FIG. 18 is a diagram showing a schematic configuration of the distance measuring device 1 according to the second embodiment. As shown in FIG. 18, the distance measuring device 1 according to the second embodiment is different from the distance measuring device 1 shown in FIG. 2 in that the sensor 18 is configured by two-dimensional light receiving elements. The distance measuring device 1 according to the second embodiment is also different from the distance measuring device 1 according to the first embodiment in that the distance measuring device 1 according to the second embodiment is capable of intermittently irradiating the laser light L1 having a wider irradiation angle than the laser light L1 according to the first embodiment in the same irradiation direction. The same components as the components of the distance measuring device 1 according to the first embodiment are denoted by the same reference numerals and signs and explanation of the components is omitted. Note that, in FIG. 18, illustration of the optical mechanism system 200 is omitted.

Figure 19:
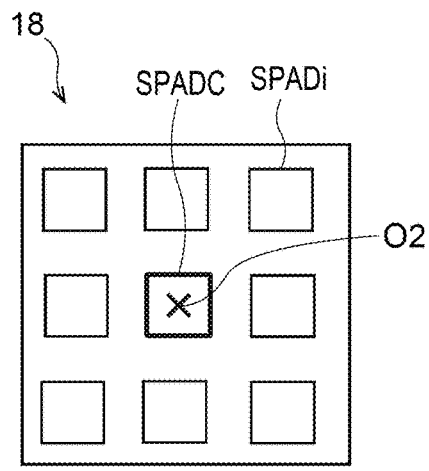
FIG. 19 is a diagram showing a configuration example of a sensor in which a plurality of light receiving elements are displayed in a matrix shape.

FIG. 19 is a diagram showing a configuration example of the sensor 18 in which a plurality of light receiving elements are disposed in a matrix shape. First, the configuration of the sensor 18 is explained with reference to FIG. 19 in view of FIG. 2.

As shown in FIG. 19, the sensor 18 includes a light receiving element disposed in the center of the sensor 18 indicated by SPADC and a plurality of light receiving elements disposed around the SPADC indicated by SPADi. In the example shown in FIG. 19, eight SPADis are disposed around the SPADC on the light receiving surface of the sensor 18. Note that the number of SPADis present around the SPADC is any number. The light receiving elements are, for example, SPAD cells and configured by an SPAD (Single-Photon Avalanche Diode) and electric elements (e.g., a resistor, a capacitor, and a semiconductor) connected to the SPAD. Such an SPAD cell is a cell in which the SPAD is used in a Geiger mode. The SPAD cell has a gain exceeding ten thousand times through Geiger discharge. Note that three SPAD cells are arrayed per one row. However, the number of SPAD cells is not limited to this.

Note that, the sensor 18 may be made of SiPM (Silicon Photomultipliers). SiPM is a photon counting device that converts Avalanche Photodiode (A D) in Geiger mode into multiple pixels. SiPM can detect weak light of photon counting level. Alternatively, the sensor 18 may be configured by arranging a plurality of photodiodes, avalanche breakdown diodes (ABDs), and the like.

As shown in FIG. 2, the lens 12 according to this embodiment is disposed in a position closer to the light source 11 than the position of the lens 12 in the first embodiment. Consequently, the laser light L1 according to this embodiment has an irradiation angle larger than the irradiation angle of the laser light L1 according to the first embodiment. That is, a beam diameter of the laser light L1 according to this embodiment is larger than the beam diameter of the laser light L1 according to the first embodiment. The laser light L1 can irradiate a plurality of irradiation directions. Note that the light source 11 may include a light source unit that emits a plurality of laser lights.

In the distance measuring device 1 according to this embodiment, a direction of light traveling in the center direction of the optical axis O1 in the laser light L1 is referred to as first irradiation direction and a direction of light traveling in a direction other than the center direction of the optical axis O1 is referred to as second irradiation direction.

The laser light L1 traveling in the center direction of the optical axis O1 is reflected on a target object and thereafter travels in the center direction of the optical axis O2 (the first irradiation direction) and is made incident on the SPADC on the light receiving surface of the sensor 18. The laser light L1 traveling in the direction along the optical axis O1 (the second irradiation direction) other than the center direction of the optical axis O1 is reflected on the target object and thereafter travels in a direction parallel to the optical axis O2 other than the center direction of the optical axis O2 and is made incident on the SPADi other than the SPADC on the light receiving surface of the sensor 18.

A traveling direction of light reflected in a direction different from the optical axis O2 among the scattered lights L3 deviates from the optical axis O2 of the light-receiving optical system 204. Therefore, even if the light is made incident in the light-receiving optical system 204, the light is absorbed by a black body or the like in the housing in which the light-receiving optical system 204 is disposed or is not made incident on the light receiving surface of the sensor 18.

As shown in FIG. 18, the AD converter 20 according to this embodiment is configured by, for example, an amplifier (AMP) 20A that amplifies an electric signal and an AD converter 20B. The amplifier 20A amplifies electric signals output by the SPADC and each of the SPADis. The AD converter 20B samples the respective amplified electric signals and converts the electric signals into a plurality of digital signal. The digital signal obtained by sampling the electric signal output by the SPADC is referred to as first digital signal. The digital signal corresponding to each of the SPADis is referred to as second digital signal.

The storage 21 includes a buffer 1 and a buffer 2 corresponding to the SPADC and each of the SPADis. The buffer 1 saves digital signals obtained by first irradiation of the laser light L1 in association with the SPADC and each of the SPADis. Similarly, the buffer 2 saves digital signals obtained by second irradiation of the laser light L1 in association with the SPADC and each of the SPADis. In this embodiment, the first digital signal corresponding to the laser light irradiated in the first direction from the emitter 100 most recently is referred to as reference digital signal. That is, the reference digital signal is saved in a buffer corresponding to the SPADC in the buffer 2. Note that the number of buffers is not limited to two and may be changed according to the number of times of irradiation "m". For example, when the laser light L1 is irradiated "M" times in the same irradiation direction, the number of buffers is set to "m".

Figure 20:
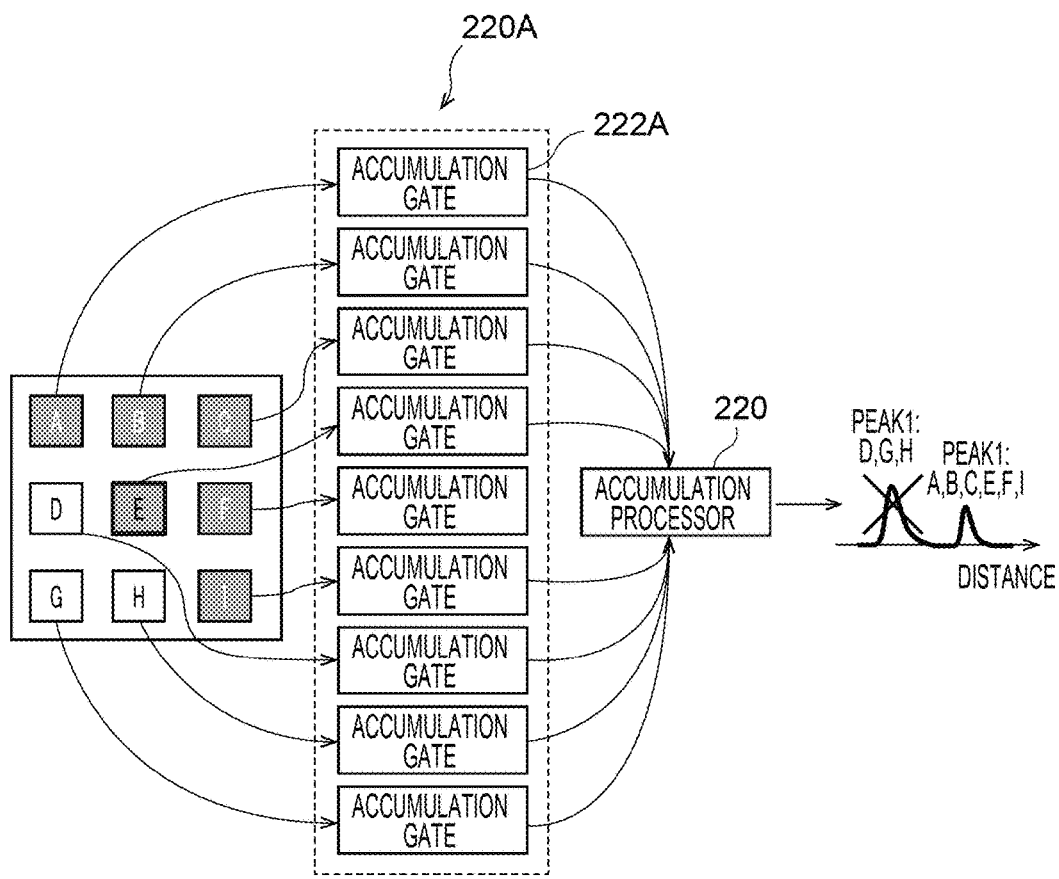
FIG. 20 is a diagram schematically showing accumulation gates.

FIG. 20 is a diagram schematically showing accumulation gates 222A. To simplify explanation, illustration of the AD converter 20 and the storage 21 is omitted. Each of a plurality of accumulation gates 222A corresponds to the SPADC and each of the SPADis.

An SPAD cell indicated by E corresponds to the SPADC. SPAD cells indicated by A, B, C, D, F, G, H, and I correspond to the SPADis.

Each of the plurality of accumulation gates 222A acquires weight values in accumulating, on the reference digital signal, the second digital signals stored in the buffer 1. The weight values are acquired on the basis of a first evaluation value indicating similarity between the reference digital signal and the second digital signals stored in the buffer 1.

Similarly, each of the plurality of accumulation gates 222A acquires weight values in accumulating, on the reference digital signal, the second digital signals stored in the buffer 2. The weight values are acquired on the basis of a first evaluation value indicating similarity between the reference digital signal and the second digital signals stored in the buffer 2.

In this case, as in the first embodiment, the first evaluation value is acquired on the basis of at least a first cumulative value obtained by accumulating the first digital signals within the time range TA and a second cumulative value obtained by accumulating the second digital signals within a time period corresponding to the time range TA.

As in the first embodiment, to acquire the first evaluation value, a first peak value based on the position of a peak of the first digital signal and a second peak value based on the position of a peak of the second digital signal may be used.

The accumulation gate 222A corresponding to the reference digital signal acquires a weight value on the basis of a second evaluation value indicating similarity between the reference digital signal and the first digital signal stored in the buffer 1. The second evaluation value is an evaluation value different from the first evaluation value. For example, a correlation value is used as the second evaluation value. That is, the accumulation gate 222A acquires, on the basis of the second evaluation value, a weight value in accumulating the reference digital signal and the first digital signal stored in the buffer 1.

The accumulation processor 220 multiplies the second digital signals stored in the buffer 1 respectively by the weight values and accumulates the second digital signals on the reference digital signal, further multiplies the second digital signals stored in the buffer 2 respectively by the weight values and accumulates the second digital signals on the reference digital signal, and further multiplies the first digital signal stored in the buffer 1 by the weight value and accumulates the first digital signal on the reference digital signal to obtain the third digital signal.

An interpolator 226 performs interpolation processing of a digital cumulative signal using, for example, an FIR (Finite Impulse Response) filter. More specifically, since a response waveform at the time when the SPAD cell receives one photon is generally an ideal response waveform of a fixed form, the FIR filter performs the interpolation processing to bring a waveform of the digital cumulative signal close to the ideal response waveform.

Figure 21:
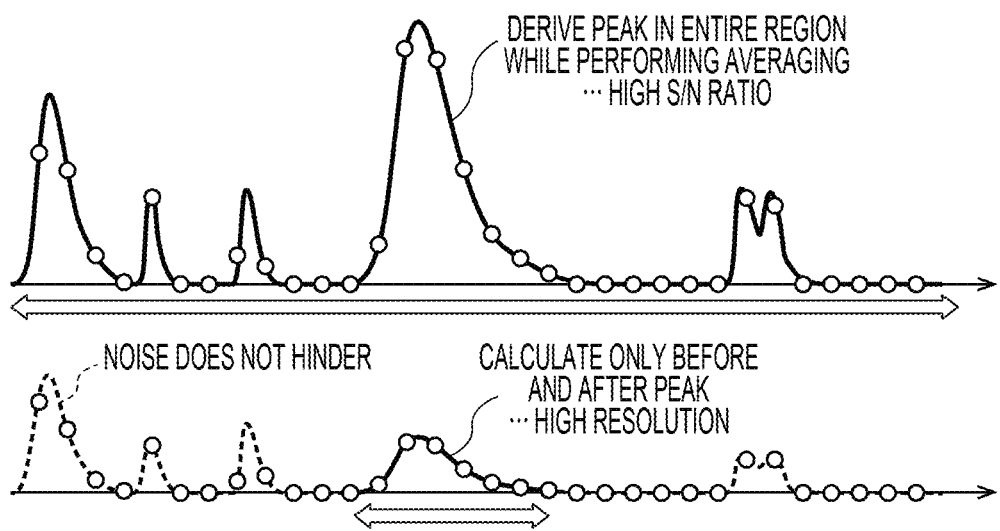
FIG. 21 is a diagram showing an accumulated third digital signal and a first digital signal before being accumulated.

FIG. 21 is a diagram showing the third digital signal subjected to time-division accumulation and the first digital signal before being subjected to the time-division accumulation. A figure on the upper side shows the third digital signal. The horizontal axis indicates sampling timing and the vertical axis indicates a value of the third digital signal. A figure on the lower side shows the first digital detection signal. The horizontal axis indicates sampling timing and the vertical axis indicates a signal value of the first digital detection signal.

In first processing, like the distance measurer 224 according to the first embodiment, for example, the distance measurer 224 detects a peak position of the third digital signal shown in the upper figure of FIG. 21.

Subsequently, the distance measurer 224 detects a peak position from the reference digital signal before accumulation again. In this case, the reference digital signal with a time range limited on the basis of the peak position calculated in the first processing is used. That is, a measurement processor 320 acquires, on the basis of a first point in time corresponding to the peak position in the third digital signal, the reference digital signal before accumulation with the limited time range. The measurement processor 320 measures the distance to the measurement target object 10 using a second point in time corresponding to the peak in the reference digital signal before accumulation with the limited time range.

Since the peak position is calculated on the basis of the third digital signal in this way, it is possible to reduce the influence of noise. Since the peak position is detected again on the basis of the reference digital signal before accumulation, it is possible to further improve measurement accuracy.

Figure 22:
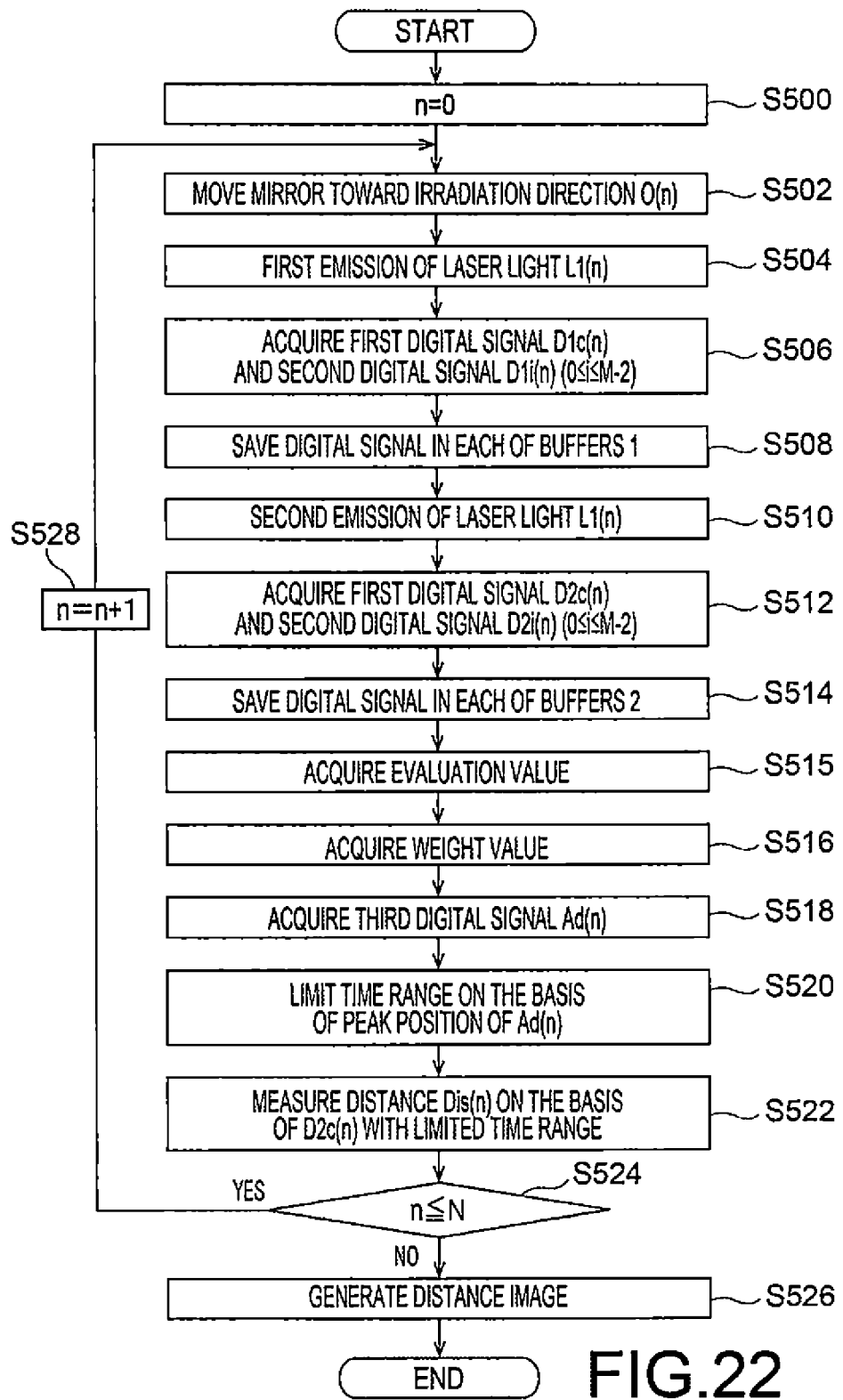
FIG. 22 is a flowchart for explaining a processing operation of the distance measuring device according to the second embodiment.

FIG. 22 is a flowchart for explaining a processing operation of the distance measuring device 1 according to the second embodiment. An overall processing operation in the distance measuring device 1 is explained with reference to FIG. 22.

First, the controller 16 in the emitter 100 sets 0 in "n" and controls the second driving circuit 16a to change the position of the mirror 15 toward the irradiation direction O(n) (steps 500 and 502).

Subsequently, the controller 16 controls the oscillator 11a and the first driving circuit 11b to perform first emission of the laser light L1(n) (step 504).

Subsequently, the AD converter 20 performs sampling of electric signals output by the respective SPAD cells of the sensor 18 in response to the reflected light L2(n) and causes the buffer 1 to store a first digital signal D1$c$(n) and a second digital signal D1$i$(n) ($0 \leq i \leq M-2$) (steps 506 and 508). The first digital signal is represented by D1$c$(n) and the second digital signal stored in the buffer 1 is represented by D1$i$(n) ($0 \leq i \leq M-2$). "M" indicates the number of light receiving elements included in the sensor 18. "M" is, for example, eight.

Subsequently, the controller 16 controls the oscillator 11a and the first driving circuit 11b to perform second emission of the laser light L1(n) (step 510).

Subsequently, the AD converter 20 performs sampling of electric signals output by the respective SPAD cells of the sensor 18 in response to the reflected light L2(n) and causes the buffer 2 to store a first digital signal D2$c$(n) and a second digital signal D2$i$(n) ($0 \leq i \leq M-2$) (steps 512 and 514). The first digital signal stored in the buffer 2, that is, the reference digital signal is represented by D2$c$(n) and the second digital signal stored in the buffer 2 is represented by D2$i$(n) ($0 \leq i \leq M-2$).

Subsequently, each of the accumulation gates 222A in the weight value generator 220A acquires a second evaluation value Ev2(D2$c$(n), D1$c$(n)) and first evaluation values Ev11(D2$c$(n), D1$i$(n)) ($0 \leq i \leq M-2$) and Ev12(D2$c$(n), D2$i$(n)) ($0 \leq i \leq M-2$) corresponding to digital signals in the buffers 1 and 2 corresponding to the accumulation gate 222A (step 515). The second evaluation value indicating similarity between the first digital signal D1$c$(n) stored in the buffer 1 and the reference digital signal D2$c$(n) stored in the buffer 2 is represented by Ev2(D2$c$(n), D2$c$(n)). The first evaluation value indicating similarity between the reference digital signal D2$c$(n) and the second digital signal D1$i$(n) ($0 \leq i \leq M-2$) stored in the buffer 1 is represented by Ev11(D2$c$(n), D1$i$(n)) ($0 \leq i \leq M-2$). The first evaluation value indicating similarity between the reference digital signal D2$c$(n) and the second digital signal D2$i$(n) ($0 \leq i \leq M-2$) stored in the second buffer 2 is represented by Ev12(D2$c$(n), D2$i$(n)) ($0 \leq i \leq M-2$).

Subsequently, each of the accumulation gates 222A acquires a weight value W (D2$c$(n), D1$c$(n)), a weight value W1(D2$c$(n), D2$i$(n)) ($0 \leq i \leq M-2$), and a weight value W2(D2$c$(n), D2$i$(n)) ($0 \leq i \leq M-2$) (step 516). The weight value between the reference digital signal D2$c$(n) and the first digital signal D1$c$(n) stored in the buffer 1 is represented by W (D2$c$(n), D1$c$(n)). The weight value between the reference digital signal D2$c$(n) and the second digital signal D1$i$(n) ($0 \leq i \leq M-2$) stored in the buffer 1 is represented by W1(D2$c$(n), D1$i$(n)) ($0 \leq i \leq M-2$). The weight value between the reference digital signal D2$c$(n) and the second digital signal D2$i$(n) ($0 \leq i \leq M-2$) stored in the buffer 2 is represented by W2(D2$c$(n), D2$i$(n)) ($0 \leq i \leq M-2$).

Subsequently, the cumulative signal generator 220B acquires, on the basis of the weight values acquired by each of the accumulation gates 222A, the third digital signal Ad(n) obtained by accumulating the digital signals in the buffers 1 and 2 (step 518).

Subsequently, the distance measurer 224 limits the time range on the basis of a peak position of the third digital signal Ad(n) subjected to the interpolation processing by the interpolator 226 (step 520).

Subsequently, the distance measurer 224 measures the distance Dis(n) on the basis of the reference digital signal D2c(n) with the limited time range and supplies the distance Dis(n) to the image processor 400 (step 520).

The distance measurer 224 determines whether "n" is equal to or smaller than "N" (step 524). When "n" is equal to or smaller than "N" (YES in step 524), the distance measurer 224 adds 1 to "n" (step 528) and repeats the processing from step 502.

On the other hand, when "n" is larger than "N" (NO in step 524), the image processor 400 generates a two-dimensional distance image on the basis of the distance Dis(n) (0≤n<N) (step 526) and ends the processing operation for generating one two-dimensional distance image in the distance measuring device 1.

In this way, after two times of irradiation on the same measurement point ends, the accumulation gate 222A acquires the second evaluation value Ev2(D2c(n), D1c(n)), the first evaluation value Ev11(D2c(n), D1i(n)) (0≤i≤M−2), and the first evaluation value Ev12(D2c(n), D2i(n)) (0≤i≤M−2), and the weight value W (D2c(n), D1c(n)), the weight value W1(D2c(n), D1i(n)) (0≤i≤M−2), and the weight value W2(D2c(n), D2i(n)) (0≤i≤M−2). Thereafter, the accumulation processor 220 subjects the third digital signal Ad(n) to accumulation processing using the weight value W (D2c(n), D1c(n)), the weight value W1(D2c(n), D1i(n)) (0≤i≤M−2), and the weight value W2(D2c(n), D2i(n)) (0≤i≤M−2). The distance measurer 224 measures a distance on the basis of the third digital signal Ad(n) subjected to the interpolation processing by the interpolator 226.

As explained above, with the distance measuring device 1 according to this embodiment, the weight value generator 220A generates, on the basis of similarity between a first digital signal corresponding to laser light irradiated in a first direction from the light source 11 most recently using the light source 11 that simultaneously intermittently emits laser lights a plurality of times in a first irradiation direction and a second irradiation direction and a plurality of second digital signals for a plurality of times, weight values of the plurality of second digital signals. Consequently, it is possible to reduce noise included in the plurality of second digital signals. A signal obtained by weighting the plurality of second digital signals is accumulated on the first digital signal to generate a third digital signal. Therefore, it is possible to accurately and stably measure the distance to a target object using the third digital signal.

In all the embodiments described above, all the circuits may be formed by analog circuits, or formed by digital circuits, or analog circuits and digital circuits in a mixed manner. Furthermore, each circuit may be formed by an integrated circuit (IC), an application specific integrated circuit (ASIC) or a field-programmable gate array (FPGA). Part of all of the functions may be controlled by a program, and information processing by software may be specifically implemented using hardware resources.

For example, all the device may be formed by microprocessor and/or analog circuit implemented or implemented by a dedicated circuit.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A distance measuring device comprising:
   a sensor section configured to convert a reflected light of a laser beam irradiated in a first irradiation direction and a reflected light of the laser beam irradiated in a second irradiation direction via a light receiving optical system to a first digital signal and a second digital signal;
   a weight value generator configured to generate a weight value that increases as a similarity between the first digital signal and the second digital signal increases;
   a cumulative signal generator configured to accumulate the first digital signal and the second digital signal based on the weight value to generate a third digital signal; and
   a distance measurer configured to measure a distance to a target object on the basis of a time difference between irradiation timing of the laser light and timing of a peak position in the third digital signal.

2. The distance measuring device according to claim 1, wherein
   the weight value generator includes:
      a first cumulative value calculator configured to calculate a first cumulative value obtained by accumulating, within a predetermined period, a plurality of the first digital signals obtained by respectively digitizing reflected lights of the laser light intermittently irradiated in the first irradiation direction;
      a second cumulative value calculator configured to calculate a second cumulative value obtained by accumulating, within the predetermined period, a plurality of the second digital signals obtained by respectively digitizing reflected lights of the laser light intermittently irradiated in the second irradiation direction; and
      a first ratio calculator configured to calculate a ratio of the first cumulative value and the second cumulative value, and
   the weight value generator generates the weight value of the second digital signal on the basis of the ratio.

3. The distance measuring device according to claim 2, wherein the weight value generator further reduces the weight value as the ratio increases to a value larger than one or decreases to a value smaller than one.

4. The distance measuring device according to claim 1, wherein the weight value generator calculates, as a first calculation value, a signal representing an S/N ratio within a predetermined period of the first digital signal, calculates, as a second calculation value, a signal representing an S/N ratio within the predetermined period of the second digital signal, and generates the weight value of the second digital signal on the basis of a ratio of the first calculation value and the second calculation value.

5. The distance measuring device according to claim 1, wherein
   the weight value generator includes:
      a first peak value detector configured to detect a first peak value at which signal amplitude of the first digital signal is maximized or minimized;
      a second peak value detector configured to detect a second peak value at which signal amplitude of the second digital signal is maximized or minimized; and
      a second ratio calculator configured to calculate a ratio of the first peak value and the second peak value, and the weight value generator generates the weight value of the second digital signal on the basis of the ratio.

6. The distance measuring device according to claim 1, wherein
the weight value generator includes:
a first cumulative value calculator configured to calculate a first cumulative value obtained by accumulating, within a predetermined period, a plurality of the first digital signals obtained by respectively digitizing reflected lights of the laser light intermittently irradiated in the first irradiation direction;
a second cumulative value calculator configured to calculate a second cumulative value obtained by accumulating, within the predetermined period, a plurality of the second digital signals obtained by respectively digitizing reflected lights of the laser light intermittently irradiated in the second irradiation direction;
a first ratio calculator configured to calculate a first ratio of the first cumulative value and the second cumulative value;
a first peak value detector configured to detect a first peak value at which signal amplitude of the first digital signal is maximized or minimized;
a second peak value detector configured to detect a second peak value at which signal amplitude of the second digital signal is maximized or minimized; and
a second ratio calculator configured to calculate a second ratio of the first peak value and the second peak value, and
the weight value generator generates the weight value of the second digital signal on the basis of the first ratio and the second ratio.

7. The distance measuring device according to claim 1, further comprising a light source configured to simultaneously intermittently emit the laser light in the first irradiation direction and the second irradiation direction for a plurality of times, wherein
the weight value generator generates, on the basis of similarity between a first digital signal corresponding to the laser light irradiated in the first irradiation direction from the light source most recently and a plurality of the second digital signals for the plurality of times, weight values of the plurality of second digital signals, and
the cumulative signal generator accumulates, on the first digital signal corresponding to the laser light irradiated in the first irradiation direction from the light source most recently, a signal obtained by weighting the plurality of second digital signals with the weight value to generate the third digital signal.

8. The distance measuring device according to claim 7, wherein the light source includes a lamp house configured to emit a plurality of the laser lights.

9. The distance measuring device according to claim 1, further comprising:
an irradiation optical system configured to irradiate the laser light on a measurement target object while changing irradiation directions of the laser light; and
the light-receiving optical system configured to receive reflected light of the laser light irradiated by the irradiation optical system, wherein
the sensor section includes:
an AD conversion section configured to convert the electric signal output by the sensor into digital signals at a predetermined sampling interval, and
a storage configured to store the digital signals converted by the AD conversion section respectively in association with the irradiation direction, and
the weight value generator generates the weight value on the basis of a first evaluation value indicating the similarity between the first digital signal stored in the storage and the second digital signal stored in the storage.

10. The distance measuring device according to claim 9, wherein the sensor consists of avalanche photodiodes.

11. The distance measuring device according to claim 9, wherein the sensor consists of Silicon Photomultipliers.

12. The distance measuring device according to claim 9, wherein the sensor consists of photodiodes.

13. The distance measuring device according to claim 1, wherein
the second irradiation direction is a plurality of irradiation directions based on the first irradiation direction,
the weight value generator acquires weight values of a plurality of the second digital signals respectively corresponding to the plurality of irradiation directions, and
the cumulative signal generator accumulates each of the plurality of second digital signals on the basis of the weight value corresponding to the second digital signal.

14. The distance measuring device according to claim 1, wherein the distance measurer sets a time range on the basis of timing of a peak position in a signal value of the third digital signal, detects a peak position in the first digital signal within the time range, and measures the distance on the basis of the detected peak position.

15. The distance measuring device according to claim 1, wherein
the weight value generator includes:
a first cumulative value calculator configured to calculate a first cumulative value obtained by accumulating, within a predetermined period, a plurality of the first digital signals obtained by respectively digitizing reflected lights of the laser light intermittently irradiated in the first irradiation direction;
a second cumulative value calculator configured to calculate a second cumulative value obtained by accumulating, within the predetermined period, a plurality of the second digital signals obtained by respectively digitizing reflected lights of the laser light intermittently irradiated in the second irradiation direction; and
a first calculator configured to calculate a difference value of the first cumulative value and the second cumulative value, and
the weight value generator generates the weight value of the second digital signal on the basis of the difference value.

16. The distance measuring device according to claim 1, wherein the weight value generator calculates, as a first calculation value, a signal representing an S/N ratio within a predetermined period of the first digital signal, calculates, as a second calculation value, a signal representing an S/N ratio within the predetermined period of the second digital signal, and generates the weight value of the second digital signal on the basis of a difference value of the first calculation value and the second calculation value.

17. The distance measuring device according to claim 1, wherein
the weight value generator includes:
a first peak value detector configured to detect a first peak value at which signal amplitude of the first digital signal is maximized or minimized;

a second peak value detector configured to detect a second peak value at which signal amplitude of the second digital signal is maximized or minimized; and a second calculator configured to calculate a difference value of the first peak value and the second peak value, and the weight value generator generates the weight value of the second digital signal on the basis of the difference value.

18. The distance measuring device according to claim 1, wherein the weight value generator includes:
   a first cumulative value calculator configured to calculate a first cumulative value obtained by accumulating, within a predetermined period, a plurality of the first digital signals obtained by respectively digitizing reflected lights of the laser light intermittently irradiated in the first irradiation direction;
   a second cumulative value calculator configured to calculate a second cumulative value obtained by accumulating, within the predetermined period, a plurality of the second digital signals obtained by respectively digitizing reflected lights of the laser light intermittently irradiated in the second irradiation direction;
   a first calculator configured to calculate a first difference value of the first cumulative value and the second cumulative value;
   a first peak value detector configured to detect a first peak value at which signal amplitude of the first digital signal is maximized or minimized;
   a second peak value detector configured to detect a second peak value at which signal amplitude of the second digital signal is maximized or minimized;
   a second calculator configured to calculate a second difference of the first peak value and the second peak value; and
   a third calculator configured to calculate, as a first calculation value, a signal representing an S/N ratio within a predetermined period of the first digital signal, calculates, as a second calculation value, a signal representing an S/N ratio within the predetermined period of the second digital signal, and calculate a third difference value of the first calculation value and the second calculation value, and the weight value generator generates the weight value of the second digital signal based on at least two of the first difference value, the second difference value and the third difference value.

* * * * *